United States Patent [19]

(12) United States Patent
Brett et al.

(10) Patent No.: US 11,067,718 B1
(45) Date of Patent: Jul. 20, 2021

(54) AGGREGATING SENSOR DATA FOR ENVIRONMENT CONDITIONS

(71) Applicant: Amazon Technologies, Inc., Seattle, WA (US)

(72) Inventors: Charles Edwin Ashton Brett, Seattle, WA (US); Aniruddha Basak, Seattle, WA (US); Zeya Chen, Charlottesville, VA (US); Sara Parker Hillenmeyer, Seattle, WA (US); Lizhen Peng, Seattle, WA (US); Yunfeng Jiang, Seattle, WA (US); William Evan Welbourne, Seattle, WA (US); Jay Patel, Seattle, WA (US); Sven Eberhardt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 415 days.

(21) Appl. No.: 16/008,554

(22) Filed: Jun. 14, 2018

(51) Int. Cl.
*G01W 1/00* (2006.01)
*G01W 1/02* (2006.01)
*H04W 4/38* (2018.01)

(52) U.S. Cl.
CPC .............. *G01W 1/02* (2013.01); *H04W 4/38* (2018.02); *G01W 2001/006* (2013.01)

(58) Field of Classification Search
CPC .... G01W 1/02; G01W 2001/006; H04W 4/38
See application file for complete search history.

(56) References Cited

U.S. PATENT DOCUMENTS

| 2015/0109104 | A1* | 4/2015 | Fadell | H04L 67/12 340/5.65 |
| 2015/0379344 | A1* | 12/2015 | Haas | G06Q 50/01 382/113 |
| 2016/0283823 | A1* | 9/2016 | Bartley | G06F 16/24578 |
| 2017/0108350 | A1* | 4/2017 | Nagao | G01W 1/02 |

\* cited by examiner

*Primary Examiner* — Regis J Betsch
*Assistant Examiner* — Jeremy A Delozier
(74) *Attorney, Agent, or Firm* — Athorus, PLLC

(57) ABSTRACT

Described are systems, methods, and apparatus that gathers environment condition data from different sensors at various locations within an area, aggregates the environment condition data to produce aggregated environment condition scores for the area and provides the aggregated environment condition scores to different locations within the area. While sensor data from a single sensor/device, such as a camera may provide low quality environment information, by collecting and aggregating information from multiple sensors and/or locations in the area, highly accurate aggregated environment condition scores for environment conditions may be realized. The aggregated environment condition scores may be provided to various locations within the area as representative of the environment condition at that point in time within the area, regardless of whether those locations have sensors. The aggregated environment condition scores may be used by other devices at those locations to automate one or more actions, such as adjusting lighting conditions, closing garage doors, adjusting window blind positions, etc.

20 Claims, 13 Drawing Sheets

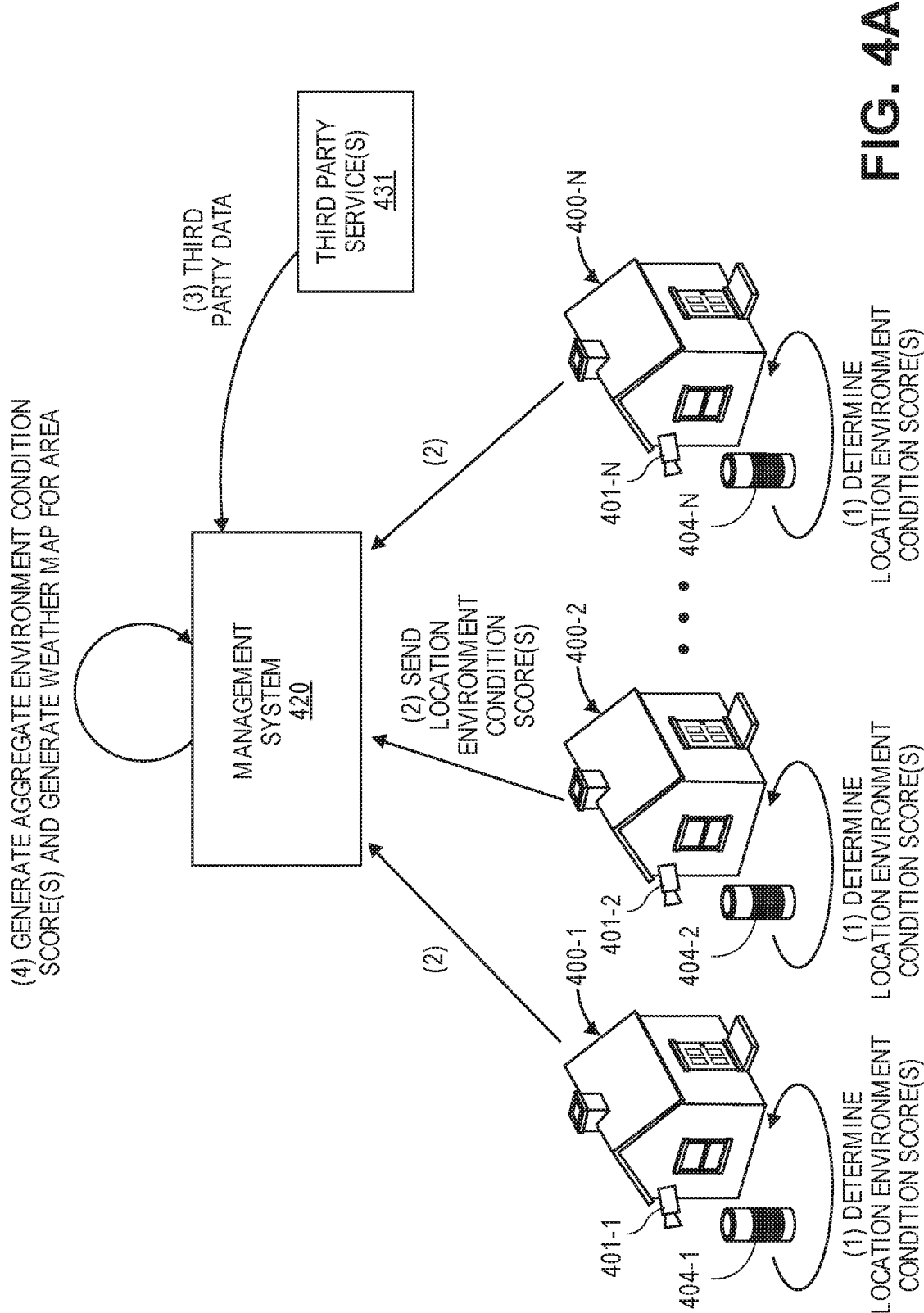

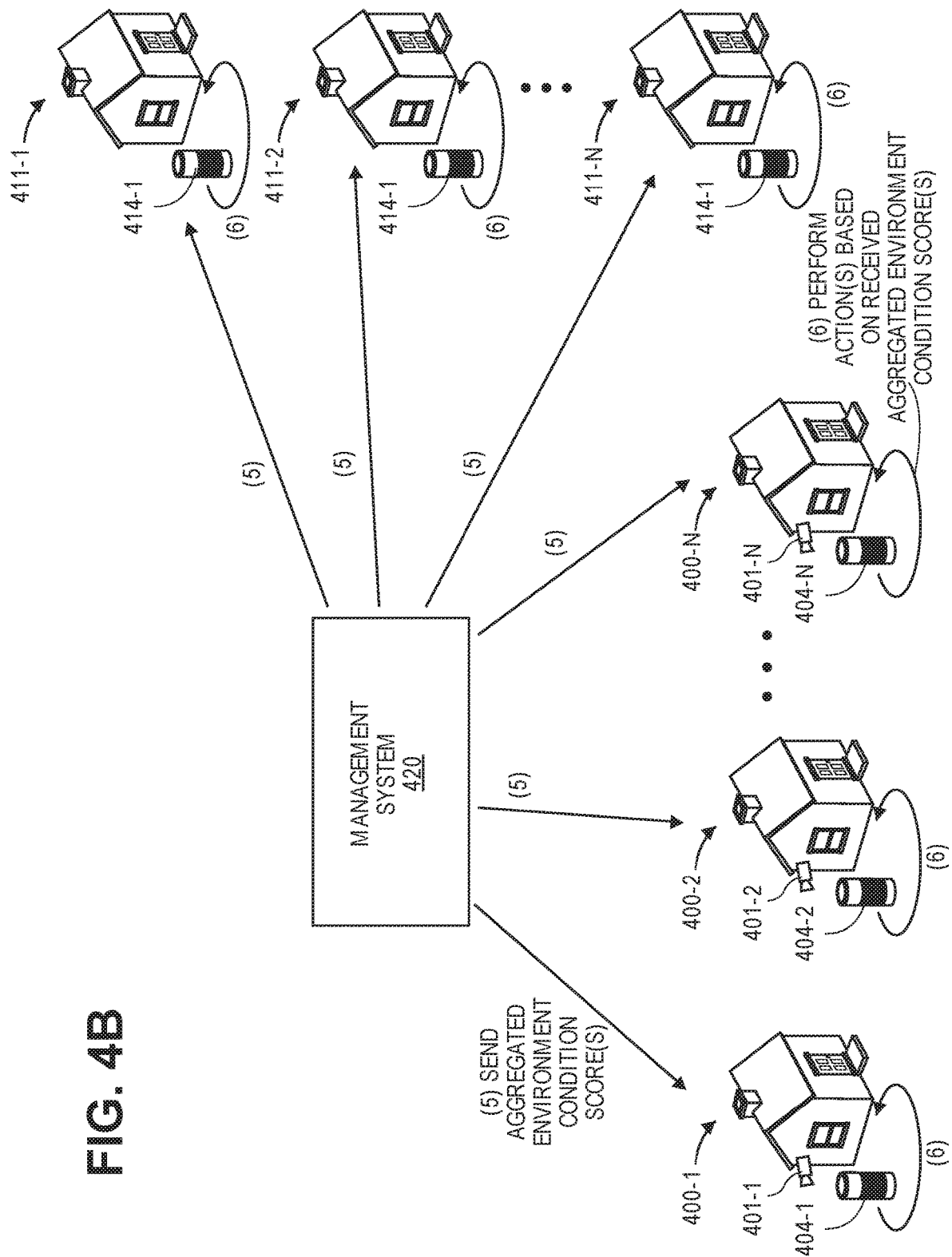

AGGREGATING SENSOR DATA FOR ENVIRONMENT CONDITIONS

BACKGROUND

Environment conditions, such as weather, are typically determined based on information gathered from weather stations that is used to generate weather maps and weather forecasts. While such information is helpful for general area weather information, it is often imprecise or irrelevant at specific locations. This is especially true the farther the location is from a weather station. For example, a weather forecast generated from weather station data may indicate heavy cloud cover. However, because clouds often move quickly through the sky, the cloud cover at different areas, even within a few hundred yards of the weather station, may vary dramatically. As a result, the outdoor ambient light may likewise vary. As another example, rain often moves in discrete areas or "walls," such that it can be raining in one location and not raining in a very nearby adjacent location (e.g., across the street). As a result, weather data regarding rain that is generated from a weather station that may be miles from a user's home is unreliable.

BRIEF DESCRIPTION OF DRAWINGS

The detailed description is described with reference to the accompanying figures.

FIGS. 4A and 4B illustrate example transition diagrams of locations monitoring environment conditions, providing environment condition scores to a remote management system, the remote management system aggregating the received environment condition scores, and providing aggregated environment condition scores to the locations and/or other locations within each area, in accordance with described implementations.

DETAILED DESCRIPTION

Figure 1:
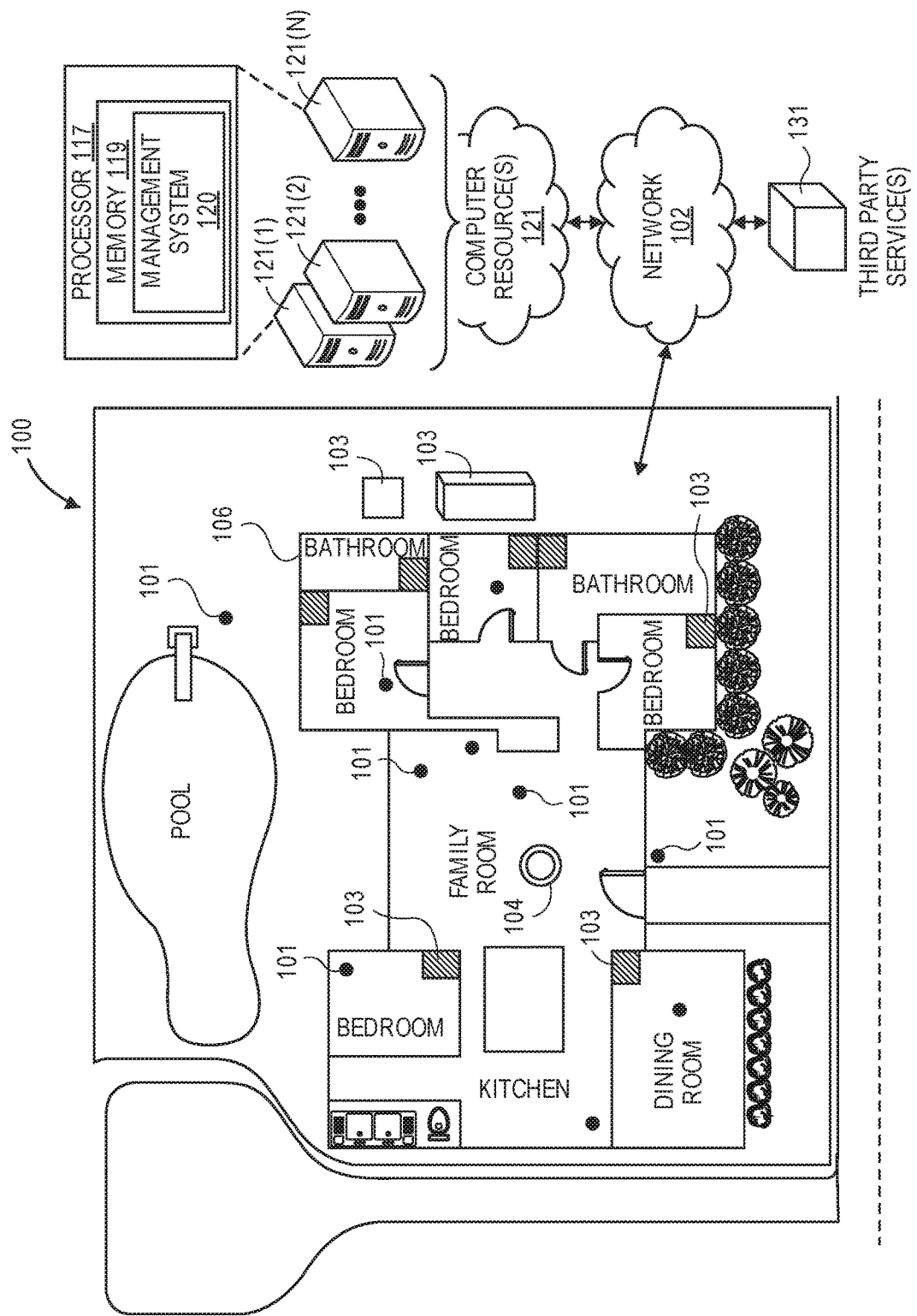
FIG. 1 is a block diagram of a location at which sensor data may be collected and used to determine one or more environment conditions at the location, in accordance with described implementations.

Described are systems, methods, and apparatus for collecting sensor data from low cost or available sensors at various locations within an area, such as sensors at homes within a neighborhood, and aggregating that data to generate aggregated environment data for the area. For example, image data from cameras at various homes within a neighborhood may be utilized to determine outdoor ambient light levels. While the information from one camera may not be very accurate for providing outdoor ambient light levels, aggregating data from multiple cameras within the area yields highly accurate and localized results for the area. For example, light level scores generated from image data from multiple cameras from different homes within a neighborhood may be aggregated to produce an aggregated light score that is both accurate and localized for the neighborhood.

In some implementations, a communication component, discussed further below, positioned at each location may receive and process sensor data from sensors at that location to produce various location environment condition scores for that location. The scores may be numeric values or other indicators representative of an environment condition that do not convey any user specific or potentially private information about the location. The various location environment condition scores generated by each of numerous communication components within an area may be sent by those communication components to a remote computing resource executing a management service. The management service, upon receiving the various location environment condition scores from the different communication components within the area may aggregate the location environment condition scores to produce aggregated environment condition scores for the area, each aggregated environment condition score representative of a different environment condition within the area. Any number of a variety of environment conditions may be determined utilizing the disclosed implementations. For example, environment conditions may include, but are not limited to, outdoor ambient light level, temperature, wind speed, wind direction, barometric pressure, whether it is raining, whether it is snowing, whether it is foggy, etc.

As used there "sensor data" refers to data generated by a sensor or device at a location. "Device environment condition score" refers to an environment condition score generated based on sensor data from a device. "Location environment condition score" refers to an environment condition score generated from one or more device environment condition scores for a location or based on sensor data from one or more devices at a location. "Aggregated environment condition score" refers to an aggregated environment condition score for an area that is produced based on an aggregation of two or more location environment condition scores from different locations within the area.

In some implementations, a communication component and/or the management system may determine the reliability or confidence that the sensor data from different sensors and/or environment condition scores are accurate representations of the environment condition being measured. In such an implementation, unreliable sensor data and/or environment condition scores may be discarded or given a lower weighting when aggregated with other sensor data, device environment condition scores, and/or location environment condition scores.

Finally, aggregated environment condition scores generated by the management system may be sent back to the communication components at the various locations within the area and/or sent to other devices within the area as accurate representations of the respective environment conditions. The communication components and/or other devices, upon receipt of the aggregated environment condition scores, may utilize the information to perform one or more autonomous actions. For example, if the aggregated environment condition score received by a communication component is an aggregated outdoor ambient light level score, the communication component may utilize that information to adjust the lighting conditions at the location by increasing or decreasing the illumination of lights, adjusting one or more window blinds, etc., so that the lighting conditions at the location remain at a level that is comfortable or desirable to users at the location.

FIG. 1 is a block diagram of a location 100 for which environment conditions are to be monitored, in accordance with described implementations. In this example, the location is a home location that includes a structure 106 in the form of a personal residence. It will be appreciated that the location and corresponding structure may be any location or structure for which one or more environment conditions are to be monitored. For example, the location may be residential, business, commercial, public, etc. Likewise, the structure may be a personal residence, apartment, office building, government building, municipal building, entertainment facility (e.g., coliseum, stadium), shopping facility, etc.

One or more sensors 101, also referred to herein as input devices, may be positioned at the location, some of which may be internal or inside the structure 106, and some of which may be external or outside of the structure 106. Any number, type, or combination of sensors may be positioned at any of a variety of positions at the location. For example, one or more cameras may be positioned inside and/or on the outside of the structure 106, each of which collect and provide image data. Cameras may include, for example, cameras on televisions, security cameras, etc. As another example, a temperature sensor and/or camera may be included in a communication component 104 that is used to provide audible outputs to a user at the location and/or receive inputs from the user, as discussed further below. In other examples, sensors may be incorporated into the structure itself. For example, a light sensor may be included in the walls or ceiling of the structure. As discussed below, the sensors may be configured to communicate with other sensors and/or a communication component 104 that is at the location to provide sensor data (e.g., temperature, video, images, motion), which is ultimately processed by the communication component 104 and/or provided to a management system 120 executing on one or more remote computer resources 121. For example, the sensors may be configured to form a wireless mesh network that enables the sensors to provide sensor data to other sensors and propagate received sensor data to the communication component 104 so that the sensor data can be processed by the communication component 104 and/or sent to the management system 120, for example via a network 102, such as the Internet. Example sensors are discussed further below with respect to FIG. 2.

In some implementations, as discussed below, the communication component 104 may receive and process sensor data to determine one or more device environment condition scores and/or location environment condition scores representative of an environment condition at the location. For example, if the sensor is a light sensor, sensor data received from the light sensor may be processed locally by the communication component 104 to determine a device environment condition score representative of the amount of light detected by the light sensor. The device environment condition score, which may be a numerical value or other form of information that does not convey personally identifiable information about the location and/or users at the location, may be combined with other device environment condition scores determined for light at the location to produce a location environment condition score for light at the location. The location environment condition score may be transmitted from the communication component 104 to the management system 120. As another example, if the sensor is a camera, image data from the camera may be processed to determine one or more device environment conditions represented in the image data. For example, if it is determined that at least a portion of the field of view of the camera is representative of the outside or outdoor area around the structure, that portion of the image data may be processed to determine one or more environment conditions. For example, the image data may be processed to determine the lighting condition outside, whether it is raining, snowing, foggy, windy, etc.

In addition to sensors, each location includes one or more appliances 103 that may be controlled by the communication component 104 and/or the management system 120. Like the sensors, the appliances may be internal or inside the structure 106, or external or outside the structure 106, and may provide various functions. In some implementations, the appliances may be configured to communicate with a communication component to either receive operation instructions and/or to provide usage information. Example appliances are discussed further below with respect to FIG. 2.

The system may also include computing resource(s) 121. The computing resource(s) 121 are remote from the location 100. Likewise, the computing resource(s) 121 may be configured to communicate over a network 102 with the location 100, the sensors 101, and/or the appliances 103. Likewise, the computing resource(s) 121 may communicate over the network 102 with one or more third party service(s) 131, such as a weather monitoring service, weather station, etc.

As illustrated, the computing resource(s) 121 may be implemented as one or more servers 121(1), 121(2), . . . , 121(N) and may, in some instances, form a portion of a network-accessible computing platform implemented as a computing infrastructure of processors, storage, software, data access, and so forth that is maintained and accessible by components/devices of the system via a network 102, such as an intranet (e.g., local area network), the Internet, etc. The computing resources 121 may process sensor data received from sensors 101 at various locations 100, data from third parties 131 and/or data from the power system 150 to determine energy saving actions that may be performed by altering an operation of one or more appliances 103 at the location 100. The server system(s) 121 does not require end-user knowledge of the physical location and configuration of the system that delivers the services. Common expressions associated for these remote computing resource(s) 121 include "on-demand computing," "software as a service (SaaS)," "platform computing," "network-accessible platform," "cloud services," "data centers," and so forth. Each of the servers 121(1)-(N) include a processor 117 and memory 119, which may store or otherwise have access to a management system 120, as described herein.

The network 102 may utilize wired technologies (e.g., wires, USB, fiber optic cable, etc.), wireless technologies (e.g., radio frequency, infrared, NFC, cellular, satellite, Bluetooth, etc.), or other connection technologies. The network 102 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 2:
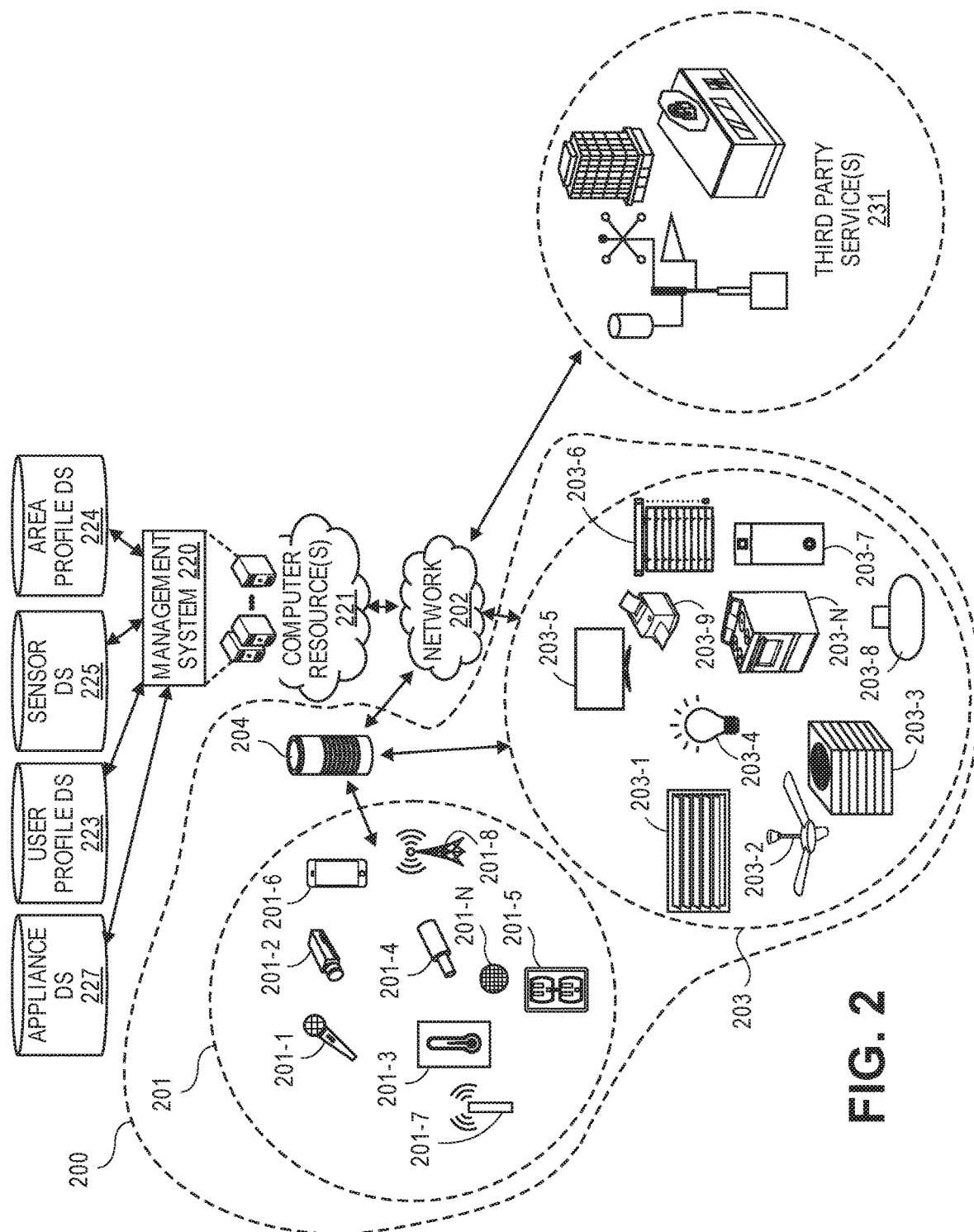
FIG. 2 illustrates example sensors and appliances of the location illustrated in FIG. 1 and the communication paths with remote systems and services, in accordance with described implementations.

FIG. 2 illustrates additional details of example sensors 201, appliances 203, and third-party services 231 illustrated in FIG. 1 and the communication paths therebetween, in accordance with described implementations. Example sensors that may be positioned at a location include, but are not limited to, a microphone 201-1, camera 201-2, temperature sensor 201-3, pressure sensor 201-4, electrical outlet sensor 201-5, portable device 201-6, vibration sensor 201-7, location sensor 201-8 (e.g., IP address, Wi-Fi, global positioning system (GPS)), a light sensor 201-N, etc. As will be appreciated, any number and/or types of sensors may be positioned at a location to collect corresponding sensor data that is utilized with the described implementations.

The sensors may by powered by battery power, electrical outlets, solar power, and/or powered from other devices or components. As another example, one or more of the sensors may receive power wirelessly from another device using wireless power transfer (WPT) using electric, magnetic, or electromagnetic fields using inductive coupling between coils of wire or by electric fields using capacitive coupling between metal electrodes or using other WPT techniques. In other implementations, the sensors may be incorporated or included in other appliances (e.g., televisions, communication components 204, and receive power from those appliances). In still other examples, the sensors may receive Power over Ethernet ("PoE"). Likewise, the sensors may be stationary at fixed locations, such as a wall mounted light sensor and/or camera, or sensors may be portable, such as a sensor included in a portable computing device (e.g., smart phone).

In addition to collecting sensor data, the sensors 201 may be configured to communicate with other sensors and/or communicate with a communication component 204 that is also positioned within the location. For example, the sensors 201 may form a wireless mesh network and provide sensors data among the mesh network. Likewise, the communication component 204 may also be included in the mesh network and eventually receive the sensor data that is transmitted via the mesh network and send the sensor data, device environment condition scores, and/or location environment condition scores to the computer resources 221 via the network 202. Any form of wired and/or wireless communication may be utilized to facilitate communication between the devices, sensors and/or appliances. For example, any one or more of 802.15.4 (ZIGBEE), 802.11 (WI-FI), 802.16 (WiMAX), BLUETOOTH, Z-WAVE, near field communication ("NFC"), etc., may be used to communicate between the devices and one or more sensors and/or appliances.

The sensor data may include, among other information, a sensor identifier that uniquely identifies the sensor, a timestamp or time indicator indicating a time or timeframe during which the sensor data was collected, and/or other information. In some implementations, the sensors may be configured to measure the environment or condition at a periodic interval (e.g., every 30 seconds) and include the measurement in the sensor data. Likewise, the sensor measurements may be maintained by the sensor and accumulated into sensor data that includes multiple sensor measurements. At a defined period of time (e.g., every 5 minutes), the sensor data may be transmitted by the sensor to other sensors and/or to the communication component 204. A sensor, upon receiving sensor data from another sensor may forward the sensor data to other sensors or to the communication component so that the transmitted sensor data from all sensors at the location are propagated to the communication component at the location. In still other examples, sensors may be configured to compute device environment condition scores based on the sensor data generated at the sensor/device.

Appliances 203 at a location may include any one or more items that communicate with and/or are controlled by the communication component 204 at the location. Appliances may include, but are not limited to adjustable vents 203-1, ceiling fans 203-2, HVAC 203-3, lights 203-4, televisions 203-5, window blinds 203-6, pool pumps or heaters 203-7, hot water heaters 203-8, office equipment, such as computers or printers 203-9, kitchen appliances 203-N (e.g., microwave, stove, refrigerator, freezer), etc. Appliances 203 are configured to receive and execute instructions included in command data sent from the communication component 204 and/or the management system 220 operating on a remote computing resource.

In some implementations, the communication component 204 may forward sensor data received from the various sensors to the management system for processing by the management system 220 and/or forward command data received from the management system 220 to various appliances 203 for execution. In other implementations, some or all of the processing of the sensor data may be performed by the communication component 204, alone or in combination with the management system. For example, the communication component 204 may receive sensor data from sensors and process the sensor data to generate one or more device environment condition scores and/or location environment condition scores. In addition, the communication hub 205 and/or the communication component 204 may receive aggregated environment condition scores from the management system 220 and determine if there are one or more actions that are to be performed by one or more of the appliances based on the received aggregated environment condition scores. If one or more actions are to be performed, the communication component 204 may send command data to the appropriate appliance(s) to execute those actions. As another example, the communication component 204 may compare a device environment condition score determined for a sensor 201 with a received aggregated condition score to determine the reliability of the sensor data received from the sensor. For example, if the sensor is a camera and the environment condition is outdoor ambient light, the communication component 204 may compare a device environment condition score for illumination determined from sensor data received from the camera with an aggregated environment condition score for illumination received from the management system 220 to determine whether the camera accurately detects outdoor ambient lighting conditions. In this example, if the device environment condition score is similar to the aggregated environment condition score, it can be determined that the field of view of the camera is at least partially representative of the outdoor environment and thus, the outdoor ambient light level. If the scores are different, it can be determined that the device does not produce sensor data that is usable for computing that environment condition score.

In still other examples, the communication component 204 may process the sensor data to determine an event representative of the sensor data and send an event identifier to the management system. For example, the communication component 204 may receive audio data from a microphone 201-1 and process the audio data to determine footsteps (an event) are detected in the audio data. Rather than sending the audio data to the management system 220, the communication component 204 may send an event identifier indicating the occurrence of the event, in this example, footsteps. Any form of sensor data, such as audio, video, temperature, etc., may be processed by the communication component 204 to detect events. Processing of the sensor data by the communication component 204 positioned at the location and transmitting event identifiers representative of events, device environment condition scores, and/or location environment condition scores detected in the processed sensor data to the management system 220, rather than sending the sensor data, reduces the amount of data sent between the communication component 204 and the management system 220 and also reduces any privacy or security concerns relating to the transmission of sensor data from the location to the management system.

In some implementations, one or more actions may be autonomously performed with respect to one or more appliances at the location in response to device environment condition scores determined from sensor data from one or more sensors at the location, location environment condition scores, and/or based on aggregated environment data scores received from the management system. For example, if the lighting condition (an example environment condition) an environment condition score indicating that there is sufficient outdoor lighting, one or more of the lights in or around the location may be automatically turned down or off, thereby conserving energy. In a similar manner, if the lighting condition score indicates a low outdoor ambient light level, one or more lights in or around the location may be turned on or the illumination from those lights increased.

As will be appreciated, some or all of the processing of sensor data may be performed by the sensor/device that generates the sensor data, at the communication component 204, at the management system 220, and/or a combination of two or more of the device 201, the communication component 204, and the management system 220.

Third party services 231 that may provide data to the management system 220 include any type of system or service that provides data useable by the management system 220 to determine environment conditions at various locations. For example, the third-party service 231 may be a weather service that provides weather data, weather patterns, or forecasted weather corresponding to a location that may be used by the management system 220 to determine, validate and/or verify the accuracy of one or more of sensor data, device environment condition scores, location environment condition scores, aggregated environment condition scores, etc. In another example, the third-party service may be a home monitoring service, such as an alarm monitoring service, etc.

A few of the major constraints with third party weather services is that they are sparsely located and often do not include light sensor data. Likewise, for those third-party systems that do include light sensor data, such data is only applicable for a small area around the third-party system. For example, heavy cloud cover can cause large variations in light sensor data between two locations. In some examples, the light sensor data from a light sensor at a first location may be very different than light sensor data at a second location that is less than five miles away from the first location, due to, for example, cloud cover in the area.

The implementations described herein receive the sensor data and/or environment condition scores from one or more locations, such as homes in a neighborhood, and optionally third-party data and aggregate that information to determine aggregated environment condition score for the environment condition in and around the area of the locations from which the sensor data was received. While sensor data from a single sensor at a single location may have a low quality or low degree of accuracy, aggregating sensor data from multiple sensors at the location or near the location, for example from sensors at various homes in a neighborhood, results in high quality and highly accurate environment condition scores that are relevant to that specific area. For example, if location environment condition scores for outdoor ambient light level are received from fifty locations within a neighborhood and aggregated, the resulting aggregated environment condition score for that area (the neighborhood) provides a highly accurate representation of the outdoor ambient light level in that neighborhood. As discussed further below, the aggregated environment condition score (s) for an area may be provided back to the locations from which sensor data and/or location environment condition scores were received and/or provided to other locations, such as homes, within the area. Each location that receives the aggregated environment condition score(s), regardless of whether the location includes sensors and/or provides sensor data or location environment condition scores, may utilize the aggregated environment condition scores to autonomously perform actions such as, but not limited to, altering artificial lighting conditions, opening/closing windows, opening/closing blinds, etc.

The management system 220 may also maintain data stores, such as an appliance data store 227, a user profile data store 223, a sensor data store 225, and/or an area profile data store 224. The various data stores maintain current, historical, and projected future information about the locations, sensors, appliances, user preferences, areas, etc., that may be used by the management system 220 to determine actions to automatically be performed by one or more appliances at locations within the area.

For example, the management system 220 may process location environment condition scores received from communication components of an area during a ten-minute window, aggregate the scores to generate an aggregated environment condition score for the outdoor ambient light level for the area and, based on an area profile corresponding to the locations from which the environment condition scores were received, determine that the lighting conditions at locations within the area are to be increased. The area data store may represent general preferences of users located within the area. In addition, in some implementations, the user profile data store 223 may be queried to determine user preferences for specific users in the area. In still other implementations, as discussed below, the aggregated environment condition scores may be provided to communication components at the locations and those communication components may determine what actions are to be performed at the respective location. The aggregated environment condition scores may be provided proactively to locations in an area for which aggregated environment condition scores are computed and/or provided in response to a request for the aggregated environment condition score.

Figure 3:
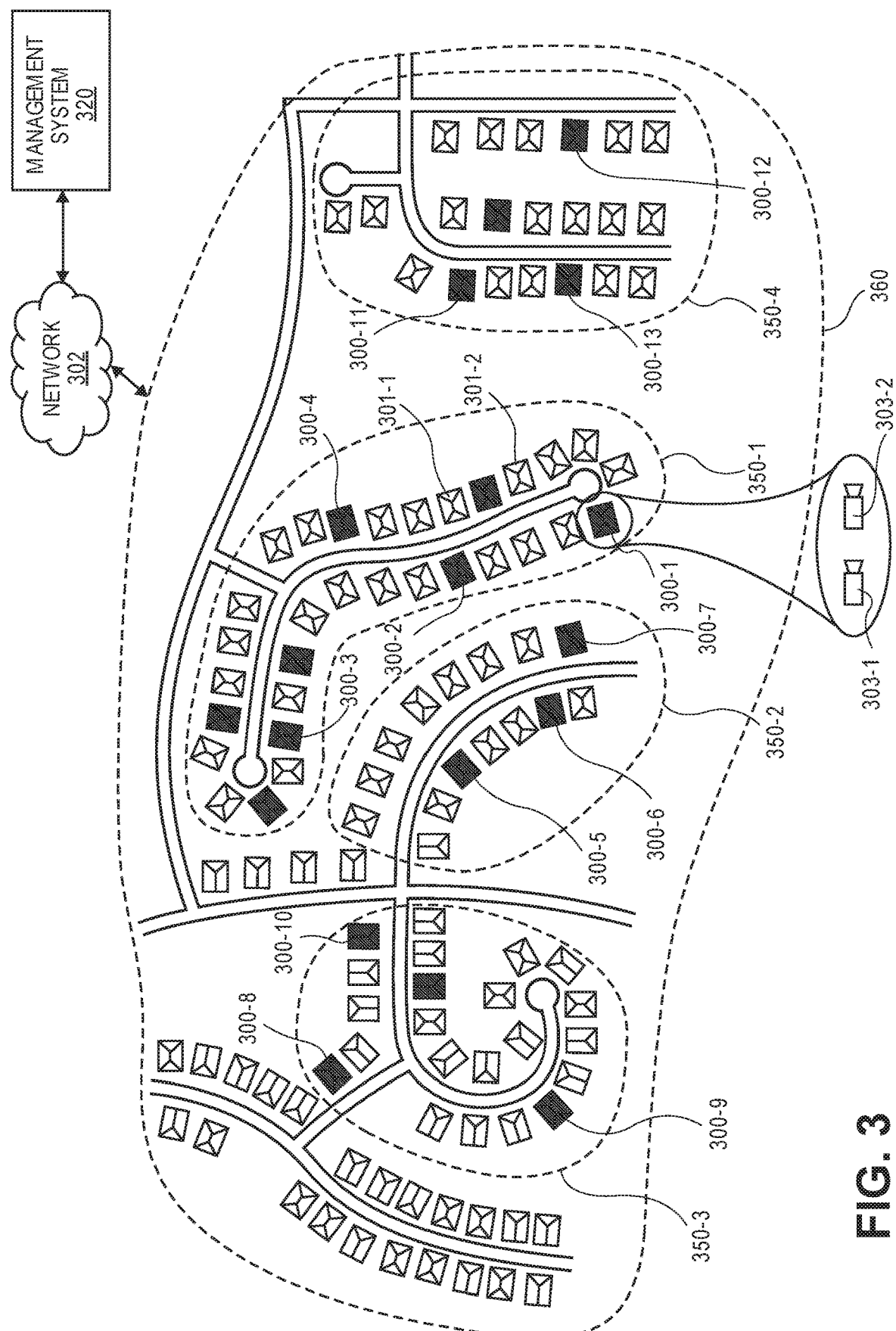
FIG. 3 illustrates example areas with multiple locations from which environment conditions may be monitored and aggregated environment condition scores provided, in accordance with described implementations.

FIG. 3 illustrates example areas 350 with multiple locations 300 from which environment conditions may be monitored and aggregated environment condition scores provided, in accordance with described implementations. In this example, the areas 350 include residential neighborhoods. Areas of locations may be determined based on a variety of factors, some areas may overlap, and some locations may be associated with multiple areas. Likewise, as discussed further below, in some implementations, an area may be dynamically determined for each location to which aggregated environment condition scores are provided. In addition, in some implementations, different areas may be established for different environment conditions for different locations. As will be appreciated, an area may be any area of any defined size or shape and may include any type of location or structure. For example, an area may be a defined geographic radius (e.g., 5 miles), a neighborhood, a community, defined by a zip code, etc. Likewise, while this example, describes personal residences, or homes, any type of structure or location may be included in an area. For example, locations may include offices, public places, restaurants, universities, hospitals, etc.

In this example, there are four areas 350-1, 350-2, 350-3, and 350-4 that are separate from one another and one larger area 360 that includes each of the four areas 350. Each area 350/360 includes one or more locations, such as personal residences. Likewise, one or more locations within an area may include one or more sensors that collect sensor data that may be processed to determine device environment condition scores for those one or more sensors at that location. The device environment condition scores at a location may then be combined to generate a location environment condition score for the location, for each environment condition.

For example, the first area 350-1 includes locations 300-1, 300-2, 300-3, and 300-4 that each include one or more sensors or devices that collect sensor data that may be processed to determine one or more device environment condition scores. For each environment condition, the respective device environment condition scores at the first location 350-1 may be combined to produce a first location environment condition score representative of that environment condition at the first location 350-1. The second area 350-2 includes locations 300-5, 300-6, and 300-7 that each include one or more sensors or devices that collect sensor data that may be processed to determine one or more device environment condition scores. For each environment condition, the respective device environment condition scores at the second area 350-2 may be combined to produce a second location environment condition score representative of that environment condition at the second location 350-2. The third area 350-3 includes locations 300-8, 300-9, and 300-10 that each include one or more sensors or devices that collect sensor data that may be processed to determine one or more device environment condition scores. For each environment condition, the respective device environment condition scores at the third area 350-3 may be combined to produce a third location environment condition score representative of that environment condition at the third location 350-3. The fourth area 350-4 includes locations 300-11, 300-12, and 300-13 that each include one or more sensors or devices that collect sensor data that may be processed to determine one or more device environment condition scores. For each environment condition, the respective device environment condition scores at the fourth area 350-4 may be combined to produce a fourth location environment condition score representative of that environment condition at the fourth location 350-4. In this example, the larger area 360, which encompasses all four of the areas and, as a result, includes locations 300-1 through 300-13 that each include one or more sensors or devices that collect sensor data. Like the other areas, the sensor data from each of locations 300-1 through 300-13 may be used to generate device environment condition scores that are combined to produce location environment condition scores for the entire fifth area 360.

As discussed, the sensor data from various sensors may be processed locally at each location 300 to generate device environment condition scores for each device and then locally combined to produce location environment condition scores. For example, a communication component may be at each location that receives the sensor data from various sensors at the location, processes the sensor data, and generates device environment condition scores for those devices and/or generates location environment condition scores for the location. In other implementations, the sensors themselves may be configured to process the sensor data and generate one or more device environment condition scores based on the sensor data.

For example, location 300-1 may include sensors that collect sensor data that may be processed to generate multiple device environment condition scores for the location. In this example, the location 300-1 includes two security cameras 303-1 and 303-2, which are example types of sensors, one of which is located outside the personal residence and one of which is located inside the personal residence at the location 300-1, but oriented such that a portion of the field of view includes an outdoor area (e.g., views an exterior window). The cameras or communication component at the location that receives the sensor data from the cameras are configured to process the sensor data and generate device environment condition scores for outdoor ambient light level, wind direction, and precipitation. In this example, classifiers have been trained for each of the environment conditions that are used to process the sensor data and generate the respective device environment condition scores. For example, the management system 320 may collect outdoor ambient light level data from sensors that are known to be positioned outside or have direct views of outdoor ambient light and utilize that information to generate a classifier that correlates different light level scores with different illumination characteristics that may be determined by processing image data. For example, the classifier may be trained around illuminance, which is measured in lux (metric unit=lumen/$m^2$) or foot-candles (English unit=lumen/$ft^2$). For example, the following Table 1 may be utilized to compute light level scores from image data collected from sensors at a location:

TABLE 1

| CONDITION | ILLUMINATION | |
|---|---|---|
| | FOOT-CANDLES (ftcd) | Lux |
| Full Daylight | 1,000 | 10,752 |
| Overcast | 100 | 1,752 |
| Very Dark Sky | 10 | 107 |
| Twilight | 1 | 10.8 |
| Deep Twilight | 0.1 | 1.08 |
| Full Moon | 0.01 | 0.108 |
| Quarter Moon | 0.001 | 0.0108 |
| Starlight | 0.0001 | 0.00108 |

In the above example, the classifier may be utilized in processing the image data from the cameras to compute an illuminance (e.g., lux) that is utilized as the device environment condition score for that sensor, also referred to herein as a camera light score.

In some implementations, processing of an image to determine light level may include, determining pixels in the image data that are representative of an outdoor environment and then only further processing those pixels. For example, one or more edge detection algorithms may be used to detect borders, such as windows or openings, in an image to determine boundaries or portions of the image that may correspond to the outdoors. Likewise, brightness differences between pixel values of adjacent pixels may be used to determine abrupt changes in lighting, colors, etc., that may be used to detect interior versus exterior conditions represented in the image. For example, if image data includes a view of an exterior window, object detection may be used to detect the position of the window and pixel value comparison may be used to determine a difference in color or illumination between pixels values of the image data corresponding to the window versus pixels values corresponding to areas adjacent the window.

In addition, to determine the illumination or outdoor ambient light level represented by pixels of the image data, in one implementation, the pixels values for each pixel, for example the Red, Greed, Blue (RGB) pixel values of pixels of an RGB image data, may be converted to grayscale and summed to produce a number between 0 and 255 for each pixel. The classifier may then average those values for pixels determined to represent outdoor ambient light levels to generate an overall average pixel value for the image. Finally, the classifier may correlate the overall average pixel value with an illumination level of Table 1 to assign a camera light score for the image data. In other implementations, the exposure level, gamma level, aperture, etc., of the camera may be utilized as factors in determining the camera light score for image data generated by the camera. In the example illustrated in FIG. 3, the cameras and/or a communication component at the location 300-1 that receives image data from the cameras 303-1, 303-2 may process the image data and generate a first camera light score for the first camera 303-1 and a second camera light score for the second camera 303-2. As will be appreciated, if other types of sensors are utilized and/or other types of environment conditions measured, the sensors or communication component at a location may generate device environment condition scores for each device/sensor and environment condition. A first camera light score and a second camera light score is just one example of device environment condition scores that may be generated from sensor data from respective devices.

Returning to FIG. 3, in addition to generating first camera light scores and second camera light scores, the communication component at the location may combine or average the first camera light score and the second camera light score to produce a light score for the location. For example, the first camera light score and the second camera light score may be averaged to produce a location light score for the first location 300-1. In other implementations, the communication component may apply a weighting to one or more of the image data or camera light scores as part of the averaging or combining of the data. In one example, the communication component at the location 300-1 may have information indicating that the first camera is positioned outside and that the entire image data from the first camera corresponds to the outdoor environment and is therefore highly representative of the outdoors and that the second camera is an indoor camera and only a portion of the image data is representative of the outdoor environment, as viewed through a window. In such an example, the computing component may assign a higher weighting factor to the first camera light score and/or assigning a lower weighting factors to the second camera light score when combining the two camera light scores to generate a location light score representative of the outdoor ambient light at the first location 300-1.

While the above example discusses generating a location light score using image data, image data may also be used to determine other environment conditions. For example, image data may be processed using one or more image processing algorithms to determine whether it is foggy, raining, snowing, etc. For example, a classifier may be trained to process a series of images generated by the first camera over a period of time to detect movement between images representative of snow or rain. Likewise, a fog classifier may be trained that compares image data generated by the first camera with a baseline image taken at a time when it is known to be clear. As part of the comparison, pixel values between the baseline image and the current image may be compared to determine a difference in visibility, an indicator of fog. In some implementations, a device environment condition score, location environment condition score, or aggregation environment condition score, discussed further below, may be a number in a range of numbers indicating a degree of the measured environment condition, such as the degree of outdoor ambient light, or the degree to which it is raining (mist, light rain, rain, heavy rain, etc.). In other examples, the environment condition score may be a binary score indicating whether a condition is occurring or not. For example, a rain score may be a binary score indicating whether it is raining (a score of unity), or not raining (a score of zero). Different actions may be performed, sometimes autonomously, based on the environment condition scores determined by the devices (device environment condition score), the location (location environment condition score), and/or based on an aggregated environment condition score determined by the management system from one or more location environment condition scores and/or device environment condition scores.

As will be appreciated, any number of environment characteristics may be determined from image data generated by a camera at a location within an area and the above are provided as examples only. Likewise, other forms of sensors may be utilized with the disclosed implementations to generate sensor data, device environment condition scores, location environment condition scores and/or location environment condition scores for each of the locations.

In some implementations, device environment condition scores and/or location environment condition scores may be used locally to cause one or more actions and/or as inputs in locally determining whether one or more actions are to be performed. For example, location light scores may be locally utilized to determine whether to adjust artificial lighting at the location. As another example, if a location environment condition score indicates that it is raining, such a determination may be utilized to automatically close windows and/or doors, such as a garage door.

While device environment condition scores and/or location environment condition scores may be used locally, in some instances, the sensor data used to generate those scores may be inaccurate or unreliable. To improve the accuracy and to provide environment condition scores to other locations within the area that is both localized to the area and accurate for the area, sensor data, device environment condition scores, and/or location environment condition scores may be provided from a plurality of locations within the environment to a remote management system 320 via a network 302. The management system may aggregate the received data and/or scores and provide aggregated environment condition scores back to various locations within the area. By aggregating environment condition scores received from multiple devices and/or locations within an area results in a higher degree of confidence and accuracy in the aggregated environment condition score. By defining areas 350 for which environment condition scores are to be aggregated, the aggregated environment condition scores are highly correlated to the current environment conditions within that area. Likewise, the aggregated environment condition scores can be sent to both locations within the area that originally provided location environment condition scores and/or device environment condition scores and to locations within the area that either do not have sensors and/or do not provide environment condition scores to the management system. Accordingly, the aggregated environment condition scores are an improvement over local only data and scores because it is more accurate and not dependent upon sensors at just that location. Aggregated environment condition scores are also more accurate for locations within the area than environment data collected at a weather station or service, that may be miles away from the location and/or area for which the aggregated environment condition scores are utilized.

Returning to FIG. 3, the management service may receive location environment condition scores and/or device environment condition scores from locations 300-1 through 300-12 and aggregate the scores based on the areas with which those locations are associated. For example, location environment condition scores and/or device environment condition scores associated with locations 300-1 through 300-4 may be aggregated for the first area 350-1, location environment condition scores and/or device environment condition scores associated with locations 300-5 through 300-7 may be aggregated for the second area 350-2, location environment condition scores and/or device environment condition scores associated with locations 300-8 through 300-10 may be aggregated for the third area 350-3, and location environment condition scores and/or device environment condition scores associated with locations 300-11 through 300-13 may be aggregated for the fourth area 350-4. Likewise, in some implementations, location environment condition scores and/or device environment condition scores may be associated with more than one area, such as larger area 360 and aggregated together by the management system 320 to generate an aggregated environment condition scores for the larger area 360. Such larger aggregated environment condition scores may be used to verify the accuracy of aggregated environment condition scores for different areas within the larger area by comparing the larger aggregated environment condition score with the aggregated environment condition scores of those areas and/or to provide aggregated environment condition scores to locations in each of the areas that will not vary among those areas. For example, the larger area 360, which in this example only covers approximately a one-mile radius, may be used to aggregate location environment condition scores and/or device environment condition scores related to outdoor ambient light levels because the outdoor ambient light level will not vary within the larger area. However, the area should not be too large as the light level may vary due to terrain variation (e.g., mountains). In comparison, because the degree of rain in the different areas 350 may vary between areas 350-1, 350-2, 350-3, and 350-4, the management service may aggregate location environment condition scores and/or device environment condition scores related to rain for each specific area 350-1, 350-2, 350-3, and 350-4, thereby providing environment conditions for rain that are both accurate and specific to each area 350.

As noted above, aggregated environment condition scores generated by the management system 320 may be provided back to locations 300 that generate and provide location environment condition scores and/or device environment condition scores, as well as provided to other locations within the areas that do not provide environment condition scores. For example, aggregated environment condition scores corresponding to the first area 350-1 may be provided to each of locations 300-1 through 300-4, as well as locations 301-1 and 301-2, which did not provide any environment condition scores.

For example, FIGS. 4A and 4B illustrate example transition diagrams of locations monitoring environment conditions, providing location environment condition scores to a remote management system, the remote management system aggregating the received location environment condition scores, and providing aggregated environment condition scores to the locations and/or other locations, in accordance with described implementations. In this example, locations 400-1, 400-2 through 400-N each include one or more sensors 401-1, 401-2 through 401-N, respectively that generate sensor data. As the sensor data is collected, in this example, the sensor data is processed by a communication component 404-1, 404-2 through 404-N that is local at each of the locations 400-1, 400-2 through 400-N. In processing the sensor data, the communication component 404 generates one or more location environment condition scores representative of one or more environment condition at the location. As discussed, the communication components may maintain classifiers that are configured and used to process sensor data and generate an environment condition scores. As will be appreciated, each communication component may maintain any number of classifiers and determine any number of device environment condition scores and/or location environment condition scores. Likewise, multiple classifiers may be used to process and generate different environment condition scores based on the same sensor data.

As the location environment condition scores are generated at each location 400-1, 400-2 through 400-N, the location environment condition scores are sent by the communication component via a network to the remote management system 420. The location environment condition scores may be continuously generated and sent, or generated and sent at periodic time intervals, such as every ten minutes. In still other examples, the location environment condition scores may be generated at each location and the communication component at that location may determine a difference between the location environment condition score and a previously sent location environment condition score and only send the current location environment condition score if there is a difference. The sent location environment condition scores may have a variety of formats and include a variety of information. In some implementations, only the necessary information may be transmitted between the location 400 and the management system 420, thereby reducing the time and cost of transmitting the location environment condition scores. For example, if multiple location environment condition scores are generated by a communication component at a location, those location environment condition scores may be bundled and transmitted as a single data packet. In such an example, the data packet may include a location identifier for the location (or communication component), timestamps indicating when the location environment condition scores were generated, and an "environment condition:location environment condition score" pair for each determined location environment condition score. The environment condition of the pair indicates the specific environment condition that is scored (e.g., light level, temperature, wind direction) and the paired "location environment condition score" indicates a value, or score computed for that environment condition at that location. In other implementations, additional or fewer data may be transmitted. For example, a communication component may also identify a sensor data type that was used to compute the location environment condition scores, the types and/or number of sensors that generated the sensor data, etc. In some implementations, the sensor data itself may be sent with or instead of the location environment condition scores. In implementations in which the sensor data is sent instead of the location environment condition scores, the remote management system may utilize the sensor data to compute device environment condition scores and/or location environment condition scores.

The management service 420, upon receiving the location environment condition scores generated at each location 400 within an area, aggregates the location environment condition scores to produce aggregated environment condition scores for the area for each measured environment condition. In some implementations, a real-time weather map may also be generated for the area based on the location environment condition scores and/or the aggregated environment condition scores for the area. As discussed further below, a variety of techniques may be used to aggregate the location environment condition scores. For example, aggregated environment condition scores may be determined for the area based on the mean, median, or mode of the location environment condition scores received from each of the locations for the same environment condition. In other implementations, one or more of the location environment condition scores may be weighted based on a determined or known accuracy of the location environment condition scores historically received from that location, based on a time at which the location environment condition was generated, etc. In addition, in some implementations, data from a third party 431, such as a weather station, may also be received and utilized. For example, weather data from a third-party weather station may be used as a baseline or confirmation to verify that the received location environment condition scores are plausible, based on the distance of the third-party service 431 (e.g., weather station) and the location 400.

Referring now to FIG. 4B, as the aggregated environment condition scores are generated, the management system 420 sends the aggregated environment condition scores to locations within the area, such as locations 400-1, 400-2 through 400-N that provided the location environment condition scores, as well as locations 411-1, 411-2 through 411-N that did not provide any location environment condition scores. Because the aggregated environment condition scores are aggregated based on location environment condition scores from multiple locations within the area, the aggregated environment condition scores are applicable to all locations 400/411 within the area.

The aggregated environment condition scores may be sent to each location as they are generated, sent periodically, sent in response to a request from a communication component at the location, etc. In some implementations, the management system may only send aggregated location environment condition scores to a location if those scores have changed compared to aggregated environment condition scores previously sent to the location.

Finally, at each location, the received aggregated environment condition scores may be utilized by the communication component at that location as an input to one or decision processes that are performed to determine if one or more actions are to be autonomously performed and/or as inputs in performing actions in response to user commands. For example, if the received aggregated environment condition score indicates an outdoor ambient light level, that information may be used by the communication component at a location to determine whether to turn on/off an appliance, such as outdoor lights at the location. Turning on/off outdoor appliances at a location may be an autonomous action that is caused by the communication component at the location and the received aggregated environment condition score, in this example, an aggregated light score, may be used as an input alone or in combination with other inputs (e.g., time of day) to determine whether to perform the action. As another example, if a user at the location issues a command, such as "Turn on the lights in the kitchen," the communication component may utilize the received aggregated environment condition score, again in this example, an aggregated light score, as an input in determining a level to which the lights are to be illuminated in the kitchen in response to the command. Other inputs in this example may include, but are not limited to, a known user preference of a light level in the kitchen, a determined amount of outdoor ambient light that reaches the kitchen (e.g., through a window, door, or skylight), etc.

Figure 5:
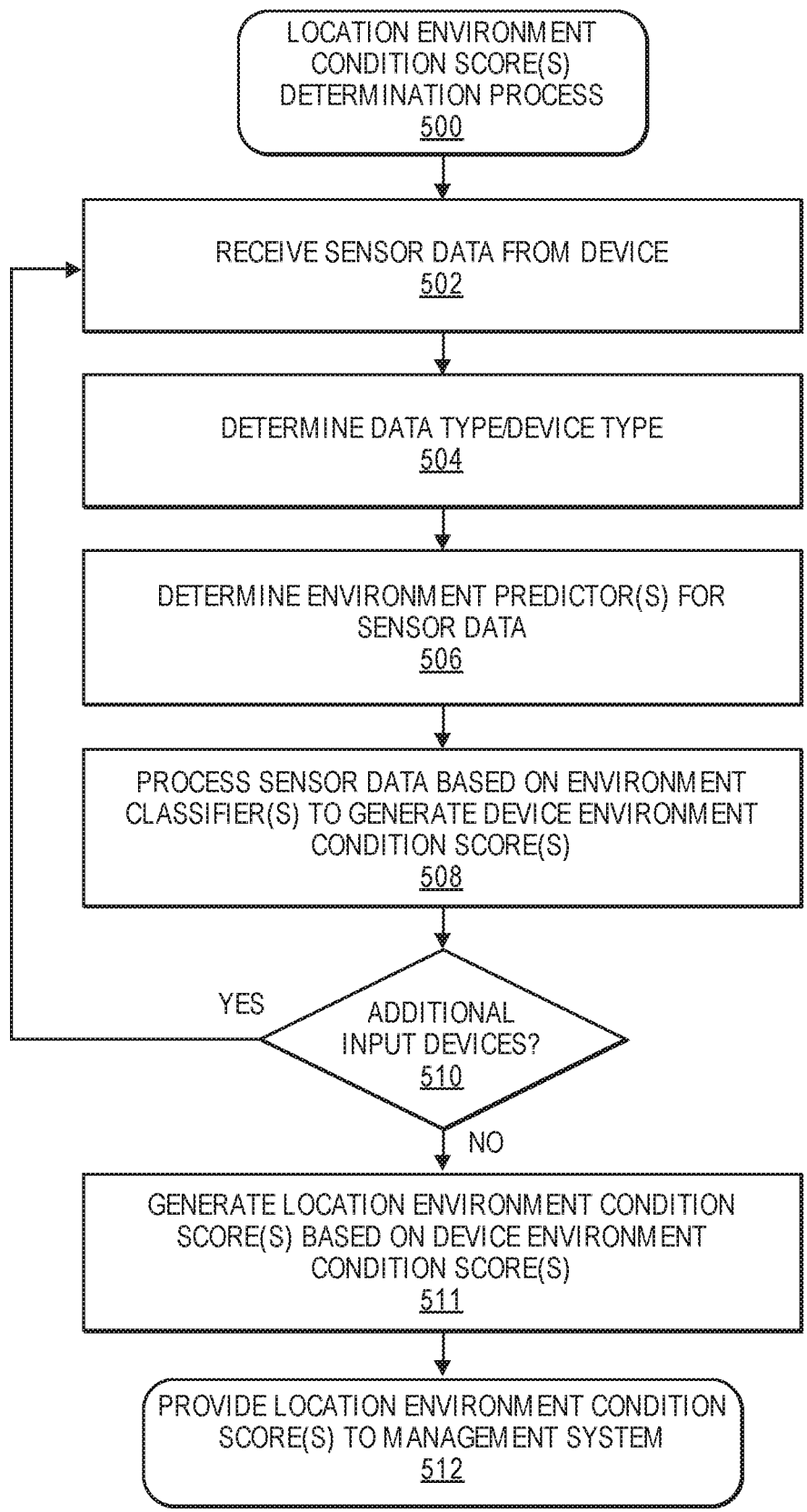
FIG. 5 is an example location environment condition score(s) determination process, in accordance with described implementations.

FIG. 5 is an example location environment condition score(s) determination process 500, in accordance with described implementations. The example process 500 may be performed at each location that generates and sends to a remote management system one or more location environment condition scores. Likewise, the example process 500 may be performed for each environment condition for which location environment condition scores are to be determined.

The example process 500 beings upon receipt of sensor data from one or more sensors or devices at the location, as in 502. Upon receipt of the sensor data, a sensor data type and/or device type is determined, as in 504. As discussed above, any of a variety of devices or sensors may be utilized with the disclosed implementations. For example, the sensor or device may be a video camera, such as a security camera, front door camera, etc., and the sensor data may be video, or image data received from the camera.

Based on the determined sensor data type and/or device type, one or more environment classifiers, also referred to herein as environment predictors, are determined for use in processing the sensor data to determine one or more device environment condition scores, as in 506. For example, environment classifiers/predictors may be established to process particular types of sensor data and, based on the determined type of the sensor data received, the appropriate classifier(s)/predictor(s) may be selected for that sensor data. In one example, the communication component may maintain a video light predictor, an image light predictor, and a light sensor classifier. The video light sensor predictor may be configured to process sensor data in the form of video data to determine a device light score representative of a light condition in the video. The image light sensor predictor may be configured to process sensor data in the form of a digital image to determine a device light score representative of a light condition in the image. The light sensor classifier may be configured to process sensor data in the form of light sensor data to determine a device light score representative of a light condition measured by the light sensor.

While each of these three example classifiers/predictors (video light predictor, image light sensor predictor, light sensor predictor) generate a device light score representative of a light level, the sensor data processed, and the processing may vary. For example, the video light predictor may process a series of frames of video data to determine an illumination level in the frames that is used to compute the device light score. In comparison, the image light predictor may process pixels of the single image to determine illumination level in the image data that is used compute the device light score.

The determined classifier(s)/predictor(s) are then used to process the received sensor data to generate one or more device environment condition scores based on the sensor data, as in 508. For example, if the sensor data is video data, a plurality of environment classifiers/predictors may be determined that are able to process the received video data to generate different device environment condition scores. Processing of the sensor data with multiple classifiers may be done in parallel or in series. For example, a video light predictor, a video wind direction predictor, and a video rain classifier may each process the video data to determine respective device environment condition scores for each of light, wind direction, and rain. In some implementations, the classifiers/predictors may be trained machine learning models that are used to process the data, such as video data, to detect particular-environment conditions. For example, a model may be trained to process video data to detect whether it is raining. In such an implementation, the model may be trained with a series of images in which it is known to not be raining and a series of images when it is known to be raining to determine differences therebetween. That model may then be used to process data from one or more devices to determine and generate a prediction as to whether it is raining, which may be represented as a device environment condition score. As will be appreciated, the models may utilize a variety of data to make predictions as to environment conditions. For example, shadows from objects represented in the video data, movement of objects (e.g., trees, bushes, branches), light variations, pixel color value changes, etc., may be used alone or in combination to generate one or more environment condition scores.

As processing of the sensor data from a device completes and device environment condition scores generated, a determination is made as to whether additional input devices exist at the location from which sensor data is or has been be received, as in 510. If it is determined that additional devices and/or sensor data remain for processing, the example process 500 returns to block 502 and continues. If it is determined that all sensor data has been processed, location environment condition score(s) are generated by the example process 500 based on the generated device environment condition scores, as in 511. The location environment condition score(s) may be generated based on a combination of device environment condition scores generated for a same environment condition. For example, if there are four cameras at a location and device light scores are computed from video data from each of those four cameras, the device light scores may be combined to generate a location light score for that environment condition.

In some implementations, a location environment condition score may be determined as the mean, median, or mode of the device environment condition scores. In other implementations, the communication component executing the example process 500 may have additional information about the devices that provided the sensor data, such as the location, orientation, sensor data quality/resolution, etc., and may weight one or more of the device environment condition scores to increase/decrease that respective device environment condition score when computing the location environment condition score for the location and the respective environment condition. If there is only one device environment condition score computed for an environment condition, that device environment condition score may be considered the location environment condition score for that environment condition.

Finally, the location environment condition score generated for each of one or more environment conditions at the location are provided to the remote management system, as in 512. In some implementations, the location environment condition scores and/or other inputs at the location may be used to determine environment condition preferences at the location and/or environment condition preferences for activities at the location. For example, it may be determined, over a period of time, the preferred lighting conditions at an interior of the location. Based on the determined preferred lighting conditions, the artificial light levels may be adjusted at the location based on the measured light level and measured outdoor ambient light level condition. As another example, one or more lighting conditions at the location during one or more activities at the location may be determined over a period of time based on data from the sensors. For example, based on sensor data, a desired light level in a dining room at a home during the hours of 18:00-22:00 on the weekdays when the family is having dinner may be determined. As will be appreciated, any number of preferred local conditions and/or preferred local activity conditions may be monitored and determined at a location. As discussed further below, such information may be utilized as a factor in performing one or more actions. Likewise, in some implementations, the preferred conditions may be sent to the remote management system and aggregated for an area in which the location is contained and provided to other locations within the area as preferred conditions for the area.

While the example discussed above describes the sensor data, device environment condition scores, and location environment condition scores being processed by a communication component at the location, in other implementations, some or all of the processing may be performed by other local devices and/or performed by one or remote devices, such as the management system. For example, in some implementations, some or all of the input devices (e.g., cameras) may be configured to process their own sensor data with various environment classifiers and provide device environment condition scores to the communication component and/or directly to the remote management system. In other implementations, sensor data may be provided directly to the remote management system for processing.

Figure 6:
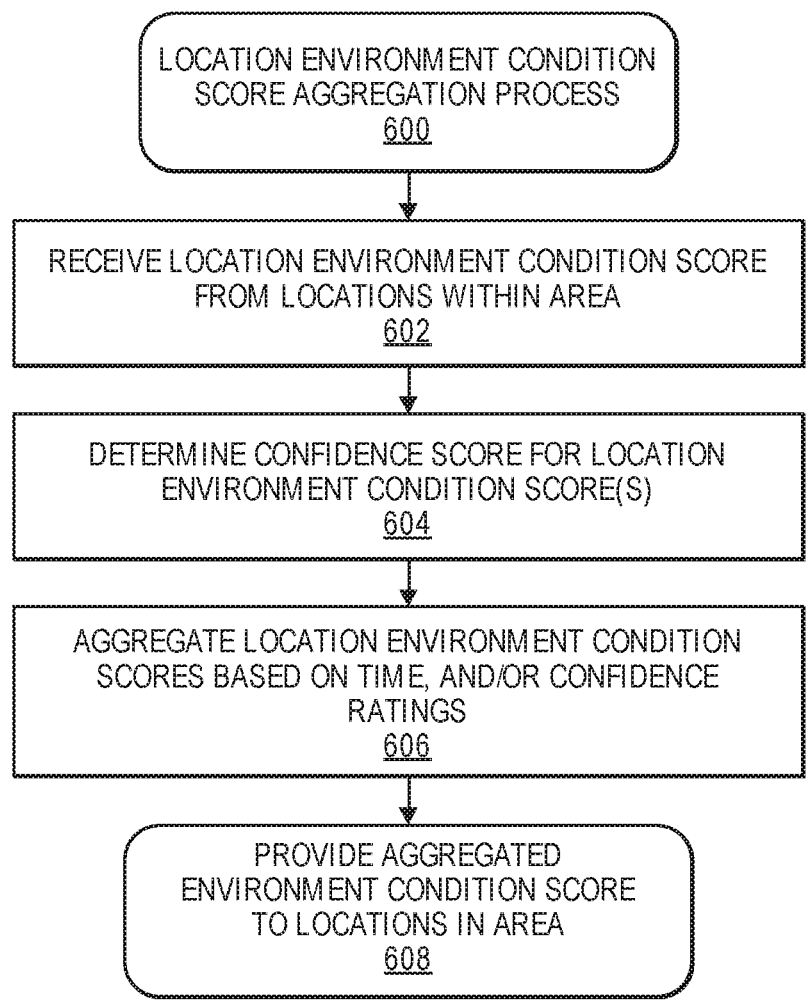
FIG. 6 is an example location environment condition score aggregation process, in accordance with described implementations.

FIG. 6 is an example location environment condition score aggregation process 600, in accordance with described implementations. The example process 600 may be performed by the remote management system that receives location environment condition scores from locations within an area. Likewise, the example process may be performed for each of a variety of environment conditions.

The example process begins by receiving location environment condition scores for an environment condition from various locations within an area, as in 602. As discussed above, the area may be any defined region, group of locations, geographic range, neighborhood, zip code, community, etc. The only constraint on an area is that it be of a small enough size such that the aggregated environment condition(s) determined for the area are applicable to locations in the area.

In some implementations, a confidence score may be determined for each location environment condition score and/or location, as in 604. For example, if three-hundred location environment condition scores are received for an environment condition within the area, any scores that are more than two or three standard deviations from the mean may be given a lower confidence score or excluded from processing as there is a low probability that the score is an accurate reflection of the actual environment condition. Additionally, in some implementations, a weight may be applied to the scores based on a difference in time, with older location environment condition scores receiving a lower weight than more recent location environment condition scores.

Utilizing the confidence score and/or weightings, the location environment condition scores for an environment condition within the area are aggregated to produce an aggregated environment condition score representative of that environment condition within the area, as in 606. The aggregated environment condition score may then be sent to one or more locations within the area for which the aggregated environment condition score was computed, as in 608. As noted above, the locations within the area to which the aggregated environment condition scores are provided may include either or both locations that provided location environment condition scores and/or locations that did not provide location environment condition scores.

While the example discussed with respect to FIG. 6 relates to generating aggregated environment condition scores for a defined area, in other implementations, aggregated environment condition scores may be generated dynamically for different locations based on received location environment condition scores that are near a location.

Figure 7:
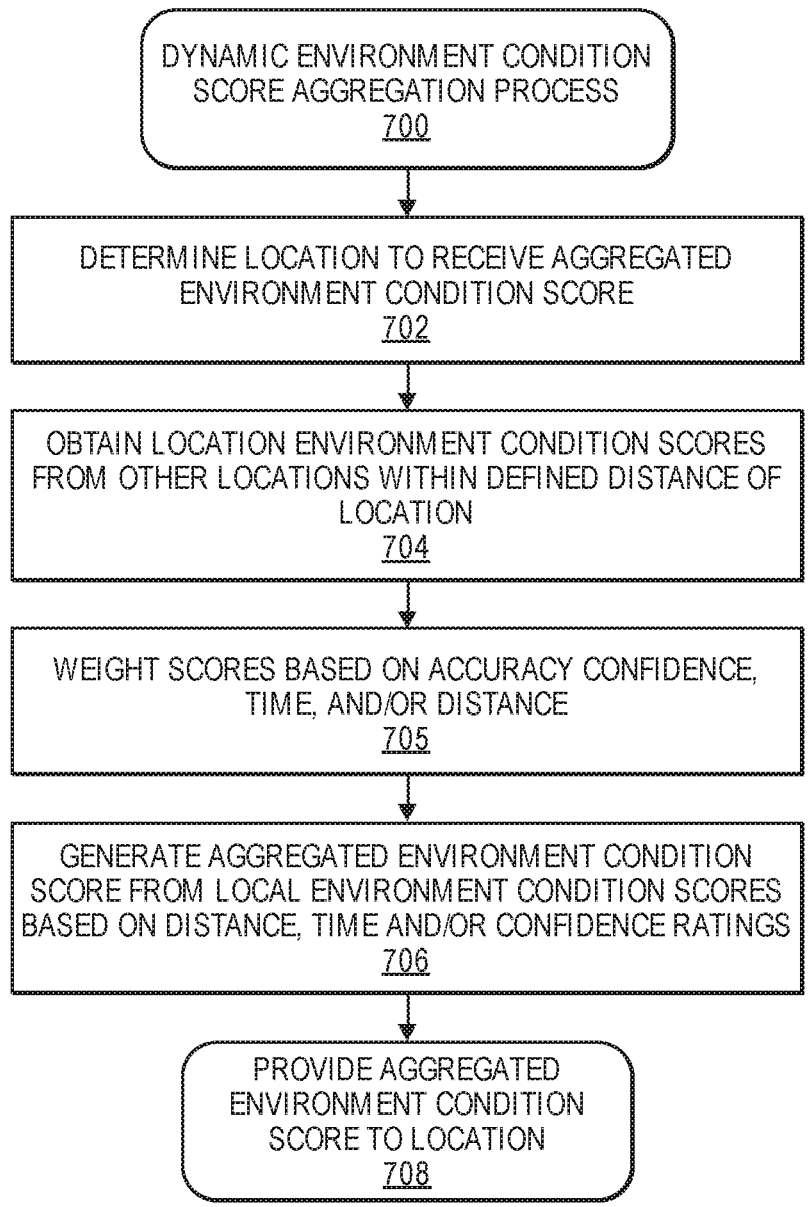
FIG. 7 is an example dynamic environment condition score aggregation process, in accordance with described implementations.

For example, FIG. 7 illustrates an example dynamic environment condition score aggregation process 700, in accordance with described implementations. In this implementation, a location that is to receive one or more aggregated environment condition scores is determined, as in 702. The location may be, for example, a location that has requested an aggregated environment condition score(s), is scheduled to periodically receive aggregated environment condition scores, etc.

For the determined location, location environment condition scores from other locations that are within a defined distance of the location are determined for obtained, as in 704. The defined distance may be any predefined distance and may be based on user preference of a user at the location, based on the environment condition score(s) to be aggregated, the time of day, etc. For example, if the environment condition score to be aggregated and provided to the location is outdoor light level, the defined distance may be a five-mile radius around the location. In comparison, if the environment condition score to be aggregated and provided to the location is rain (e.g., whether it is raining or how hard it is raining), the defined distance may be a one-mile radius around the location, thereby increasing the accuracy of the aggregated environment condition data to that location.

Similar to the discussion above with respect to FIG. 7, the location environment condition scores to be aggregated may be weighted based on a confidence that the scores are accurate and/or based on a time associated with the location environment condition scores, as in 705. In addition, in some implementations, a weighting may be applied based on a distance between the location for which the aggregated environment condition score is being generated and the location from which the location environment condition score was received, also as in 705. In such an example, location environment condition scores from locations that are farther away from the location for which the aggregated environment condition score is being generated are assigned a lower weighting factor than location environment condition scores that are closer in distance to the location for which the aggregated environment condition scores are being generated.

Utilizing the obtained location environment condition scores that are within a defined distance of the location and any weightings, the location environment condition scores are aggregated, and an aggregated environment condition score generated for the location, as in 706. Finally, the aggregated environment condition score(s) are sent to the location, as in 708.

The example processes 600 and 700 discussed with respect to FIGS. 6 and 7 may be performed independently or together. Likewise, each example processes 600, 700 may be performed for multiple different environment conditions to produce aggregated environment condition scores for different environment conditions.

Figure 8:
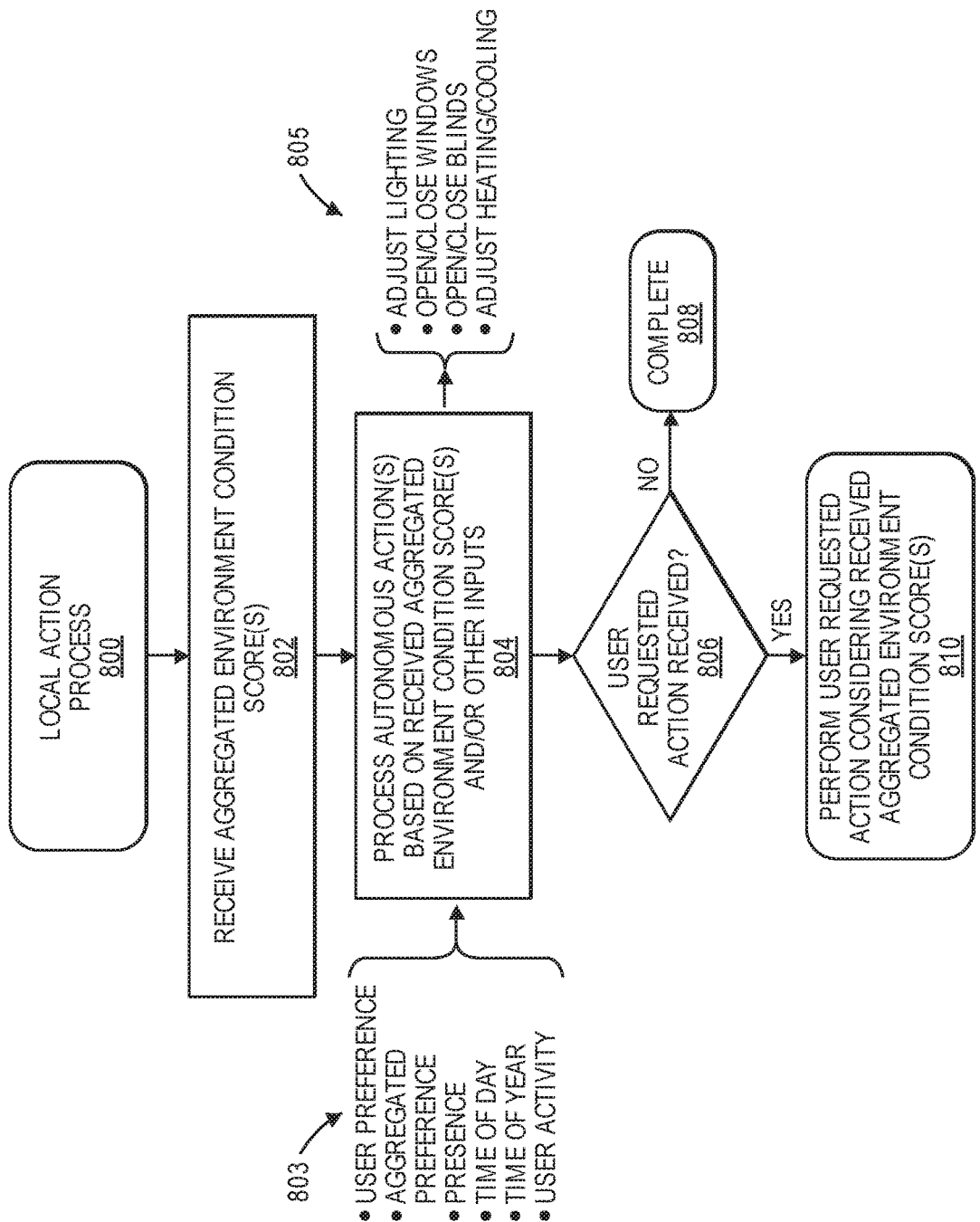
FIG. 8 is an example local action process, in accordance with described implementations.

FIG. 8 is an example location action process 800, in accordance with described implementations. The example process 800 may be performed at any location by a communication component and/or any other device at a location. The example process 800 begins by receiving aggregated environment condition score(s) at a location, as in 802. Upon receipt of one or more aggregated environment condition scores, one or more autonomous actions may be processed and the received aggregated environment condition score(s) included as inputs to the process, as in 804. In some implementations, other factors may also be considered as inputs. For example, inputs 803 that may be included in processing an autonomous action include, but are not limited to, user preferences, aggregated preferences for an area or location, detected presence of one or more users at the location, time of day, time of year, user activity, etc.

Based on the inputs, the autonomous actions may be performed. For example, if the autonomous action is for outdoor lighting, the example process may adjust the outdoor lighting if the aggregated light score received from the remote computing system is below a defined amount specified for the autonomous light process. For example, the autonomous light process may specify that outdoor lighting is to be turned on if the aggregated light score received from the management system is below a defined value and that the outdoor lighting is to be turned off if the aggregated light score is equal to or above the defined value. For example, if the aggregated light score specifies a numeric value in lux (e.g., Table 1 above) the autonomous action may specify that outdoor lighting is to be activated or turned on if the lux level is below 107 and turned off if the lux level is equal to or above 107.

Any number of autonomous actions 805 may be processed including, but not limited to, lighting adjustments, opening/closing windows, adjusting heating/cooling at the location, adjusting window blinds, etc., and any one or more aggregated environment condition scores may be utilized in processing the autonomous actions. Likewise, the autonomous actions may be processed each time an aggregated environment condition score is received from the remote management system. In other implementations, the autonomous actions may be scheduled for processing at defined times or defined time intervals. In such an example, as part of processing the autonomous actions, the appropriate aggregated environment condition scores may be obtained from the remote management system.

In addition to processing one or more autonomous actions, a determination may be made as to whether any user requested actions have been received, as in 806. User actions may be any received user input to perform an action by the example process 800. For example, a user requested action may include, but is not limited to, a user requesting to adjust lighting at the location, adjust heating at the location, open/close a window, adjust a window blind, etc. the user request may be in the form of an audible input, a gesture, a text input, etc.

If it is determined that no user requested action has been received, the example process 800 completes, as in 808. If a user requested action has been received, the action is performed considering the received aggregated environment condition score(s), as in 810. For example, if the user requested action is an audible input of "Turn on the lights in the kitchen," one of the aggregated environment conditions that may be considered in performing that action may include an aggregated light score that indicates an outdoor ambient light level. Other factors, such as the amount of outdoor light that reaches the kitchen may also be considered in performing the user requested action. In performing the action, considering the aggregated light score, the example process 800 may determine a level to which to turn on the kitchen lights so that the total light level in the kitchen, considering both the outdoor ambient light level reaching the kitchen and the artificial lighting reaches a user desired light level, as may be maintained in a user profile. Such adjustments that consider the environment conditions may increase the user comfort and save energy in that the artificial lights may not need to be turned up to full illumination level.

As discussed above, user provided phrases, such as requests to perform actions, etc., may be received and processed by a device, such as the communication component, and/or by communication services using ASR and NLU. ASR and NLU can be computationally expensive. That is, significant computing resources may be needed to process ASR and NLU processing within a reasonable time frame. Because of this, a distributed computing environment may be used when performing speech processing. A typical such distributed environment may involve a local device, such as the communication component discussed above that may be utilized to process sensor data, initiate autonomous actions and/or to receive user requests. The communication component may include one or more microphones configured to capture sounds from a user speaking and convert those sounds into an audio signal. The audio signal/data may then be sent to a remote device, such as the management system, for further processing, such as converting the audio signal into an ultimate statement or request.

A user utterance or phrase may include a statement, request, or command. For example, the request may be a simple request such as "Turn on the kitchen lights." to more detailed requests, such as "Turn off the outdoor lights when the sun comes up." In addition to receiving requests, other user inputs may be received and processed by the communication component discussed herein. Other types of inputs may include queries for information (e.g., "what is the capital of France?") to more detailed questions involving time, place, multiple entities, etc. (for example, "when was Jane Doe married to John Doe?"). Further, inputs may range in specificity and/or complexity, for example, one input may be "turn off the lights in every room except this one" whereas another may be "delay operation of the dishwasher until I go to bed." Different queries may thus involve different intents, that is, different utterances may be asking the system to perform different operations. In the examples and implementations discussed above, the user inputs have been related to intents of performing actions related to environment conditions.

As can be appreciated, natural language understanding involves a complex analysis of text (which may be obtained either from a spoken utterance or from some other source) and potentially other data to determine the text's precise meaning. The process of identifying the intent of an utterance (i.e., the ultimate desired result) may be referred to as intent classification. Present NLU query answering systems typically employ a multi-domain architecture wherein each domain represents a certain subject area for a system. Example domains include weather, music, shopping, etc. Each domain is typically configured with its own intents, slot structure, or the like as well as its own logic or other components needed to complete the NLU processing for a particular query. Thus, in order to configure a system to handle a new function, intents, slots and other items used for speech processing need to be specially designed, configured, and tested for each new domain. This leads to significant resource expenditures to train and enable the system to handle additional domains.

Further, during runtime, a speech processing system may process a single utterance using multiple domains at the same time, or otherwise substantially in parallel. As the system may not know ahead of time what domain the utterance belongs in until the speech processing is complete, the system may process text of an utterance substantially simultaneously using models and components for different domains (e.g., books, video, music, energy, weather, etc.). The results of that parallel processing may be ranked, with the highest-ranking results being executed and/or returned to the user, as appropriate.

Figure 9:
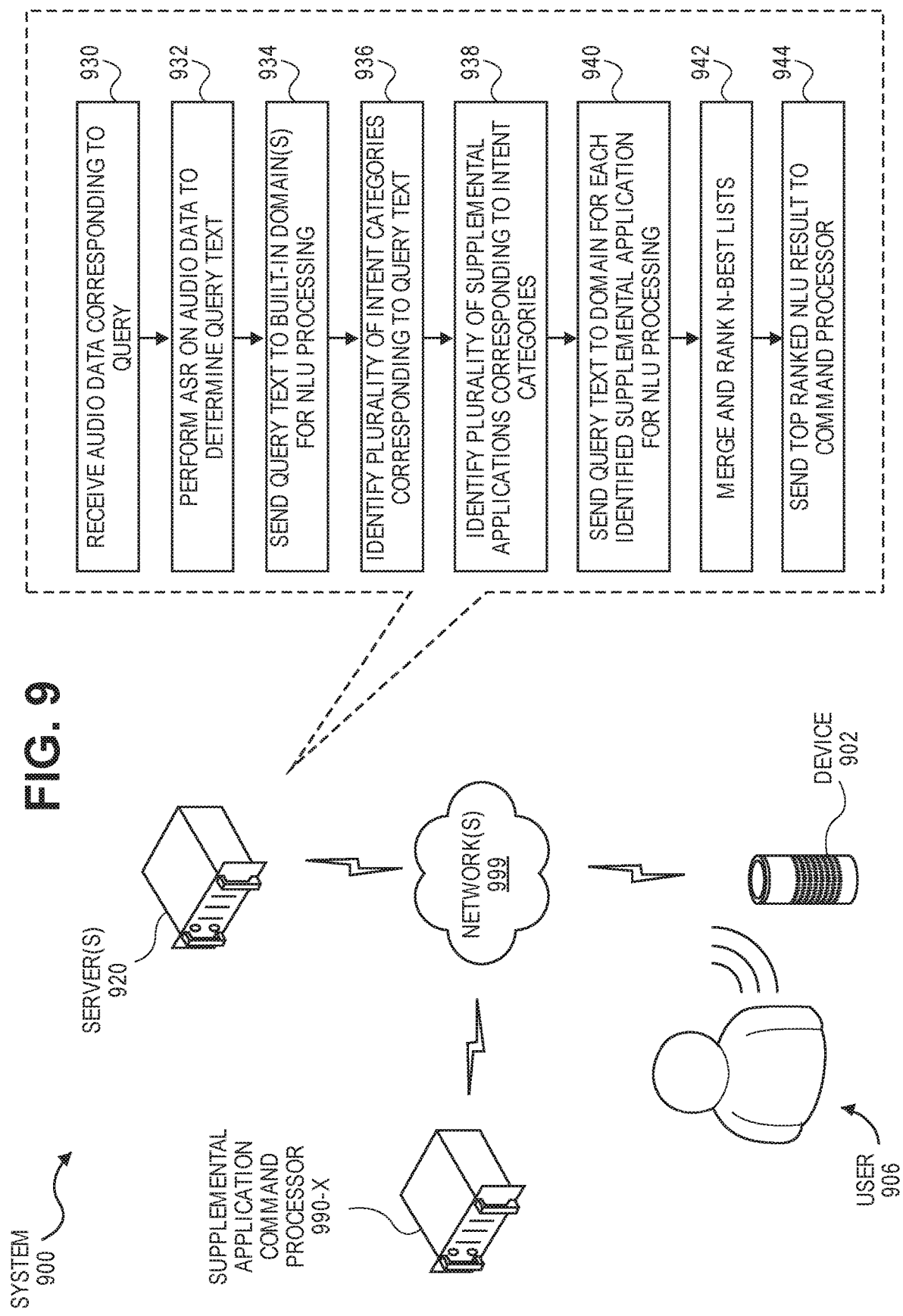
FIG. 9 illustrates a system for establishing a communication session between speech-controlled devices in an automatic speech recognition (ASR) system, in accordance with described implementations.

FIG. 9 shows a system 900 configured to perform NLU processing. A system 900 may include one or more devices 902 local to user(s) 906, as well as one or more networks 999 and one or more servers 920 connected to device 902 across network(s) 999. The server(s) 920 (which may be one or more different physical devices) may be capable of performing traditional speech processing (such as ASR, NLU, query parsing, etc.) as described herein. A single server may be capable of performing all speech processing or multiple server(s) 920 may combine to perform the speech processing. Further, the server(s) 920 may be configured to execute certain commands, such as answering queries spoken by the user 906. In addition, certain speech detection or command execution functions may be performed by the device 902.

As shown in FIG. 9, a system may receive (930) audio data corresponding to a query. The system may then perform (932) ASR on the audio data to determine query text. The system may then send (934) the query text to NLU domains corresponding to built-in functionality of the system 900. Those domains may then perform NLU processing to obtain N-best lists (one for each built-in domain). The system may also identify (936) a plurality of intent categories corresponding to the query text along with scores for how the query text matches each intent category. The system may then identify (938) a plurality of applications corresponding to the intent categories. The applications may correspond to supplemental applications created by third-party developers and added to the system 900 to enhance the system functionality. The system may then send (940) the query text to the NLU domains for each of the identified supplemental applications. Each domain for a supplemental application may then perform NLU processing to obtain N-best lists (one for each identified supplemental domain). The system may then merge and rank (942) the N-best lists resulting from the NLU processing of the built-in domains and domains for the supplemental applications. The system may then send (944) the top ranked result to a command processor 990, which, for a result associated with a supplemental application, may be a supplemental application command processor 990-X, which may be located separately from system 900.

Figure 10:
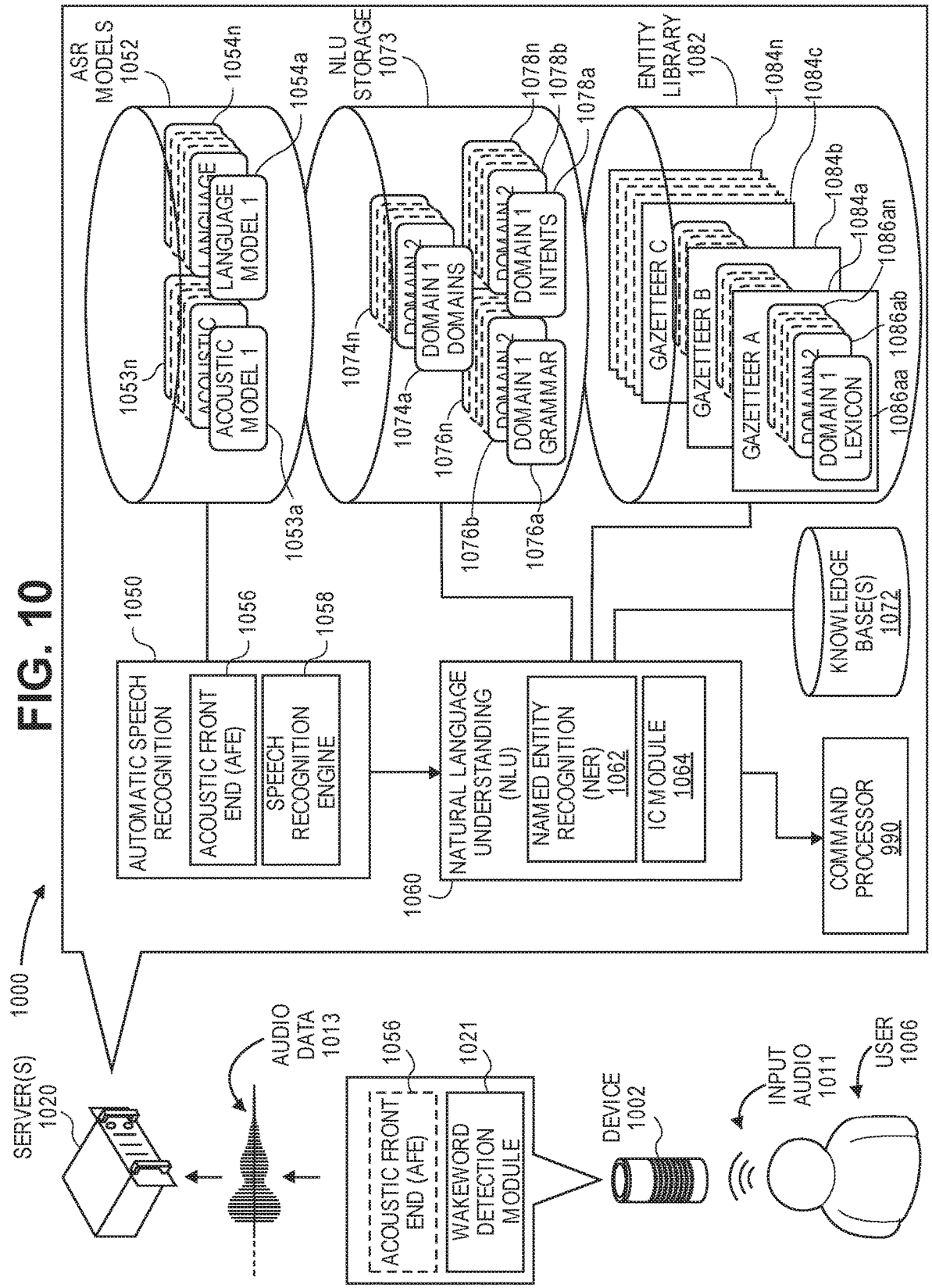
FIG. 10 illustrates example components of a speech processing system, in accordance with described implementations.

FIG. 10 is a conceptual diagram of how a spoken utterance is processed, allowing a system to capture and execute commands spoken by a user, such as spoken commands that may follow a wakeword. The various components illustrated may be located on the same or different physical devices. Communication between various components illustrated in FIG. 10 may occur directly or across a network. An audio capture component, such as a microphone of device 1002, captures audio 1011 corresponding to a spoken utterance from a user 1006. The device 1002, using a wakeword detection module 1021, then processes the audio, or audio data corresponding to the audio, to determine if a keyword (such as a wakeword) is detected in the audio. Following detection of a wakeword, the device sends audio data 1013 corresponding to the utterance, to a server 1020 that includes an ASR module 1050. The audio data 1013 may be output from an acoustic front end (AFE) 1056 located on the device 1002 prior to transmission. Or the audio data 1013 may be in a different form for processing by a remote AFE 1056, such as the AFE 1056 located with the ASR module 1050.

The wakeword detection module 1021 works in conjunction with other components of the device, for example, a microphone to detect keywords in the input audio 1011. For example, the device 1002 may convert input audio 1011 into audio data 1013, and process the audio data with the wakeword detection module 1021 to determine whether speech is detected, and, if so, if the audio data comprising speech matches an audio signature and/or model corresponding to a particular keyword.

The device 1002 may use various techniques to determine whether audio data includes speech. Some implementations may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 1002 may implement a limited classifier configured to distinguish speech from background noise. The classifier may be implemented by techniques such as linear classifiers, support vector machines, and decision trees. In still other implementations, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the input audio 1011 received by the device 1002 (or separately from speech detection), the device 1002 may use the wakeword detection module 1021 to perform wakeword detection to determine when a user intends to speak a command to the device 1002. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1021 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword and non-wakeword speech signal respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another implementation, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on, posterior threshold tuning or smoothing is applied for decision making. Other techniques for wakeword detection, such as those known in the art, may also be used.

Once the wakeword is detected, the local device 1002 may "wake" and begin transmitting audio data 1013 corresponding to input audio 1011 to the server(s) 1020 for speech processing. Audio data 1013 corresponding to the input audio 1011 may be sent to a server 1020 for routing to a recipient device or may be sent to the server for speech processing for interpretation of the included speech (e.g., for purposes of enabling communication sessions, for purposes of executing a command in the speech, or for other purposes). The audio data 1013 may include data corresponding to the wakeword, or the portion of the audio data corresponding to the wakeword may be removed by the local device 1002 prior to sending. Further, a local device 1002 may "wake" upon detection of speech/spoken audio above a threshold. Upon receipt by the server(s) 1020, an ASR module 1050 may convert the audio data 1013 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 1054a-1054n stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053a-1053n stored in an ASR Models Storage 1052), and the likelihood that a particular word which matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1050 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine. The speech recognition engine 1058 compares the speech recognition data with acoustic models 1053, language models 1054, and other data models and information for recognizing the speech conveyed in the audio data. The AFE may reduce noise in the audio data and divide the digitized audio data into frames representing time intervals for which the AFE determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the device 1002 may process audio data into feature vectors (for example using an on-device AFE 1056) and transmit that information to a server across a network for ASR processing. Feature vectors may arrive at the server encoded, in which case they may be decoded prior to processing by the processor executing the speech recognition engine 1058.

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as energy, music, banking, etc.

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc., may be sent to a server, such as server 1020, for natural language understanding (NLU) processing, such as conversion of the text into commands for execution, either by the device 1002, by the server 1020, or by another device (such as a server running a specific application like a search engine, etc.).

The device performing NLU processing 1060 (e.g., server 1020) may include various components, including potentially dedicated processor(s), memory, storage, etc. As shown in FIG. 10, an NLU component may include a named entity recognition (NER) module 1062 which is used to identify portions of query text that correspond to a named entity that may be recognizable by the system. A downstream process called named entity resolution actually links a text portion to an actual specific entity known to the system. To perform named entity resolution, the system may utilize gazetteer information (1084a, 1084b, 1084c-1084n) stored in entity library storage 1082. The gazetteer information may be used for entity resolution, for example matching ASR results with different entities (such as appliances, locations, user names, etc.). Gazetteers may be linked to users and/or locations (for example, a particular gazetteer may be associated with a specific user's preference for energy savings), may be linked to certain domains (such as energy), or may be organized in a variety of other ways.

Generally, the NLU process takes textual input (such as processed from ASR 1050 based on the utterance input audio 1011) and attempts to make a semantic interpretation of the text. That is, the NLU process determines the meaning behind the text based on the individual words and then implements that meaning. NLU processing 1060 interprets a text string to derive an intent or a desired action from the user as well as the pertinent pieces of information in the text that allow a device (e.g., device 1002) or other system, such as the management system, to complete that action. For example, if a spoken utterance is processed using ASR 1050 and outputs the text "Turn on the lights" the NLU process may determine that the user intended to initiate an action of turning on the lights in the room in which the user is located.

The NLU may process several textual inputs related to the same utterance. For example, if the ASR 1050 outputs N text segments (as part of an N-best list), the NLU may process all N outputs to obtain NLU results.

The NLU process may be configured to parse and tag or otherwise annotate text as part of NLU processing. For example, for the text "Turn on the lights," "turn on" may be tagged as a command and "lights" may be tagged as a specific entity and target of the command (and a device identifier for a device associated with the entity corresponding to "lights" that is associated with the current location of the user may be included in the annotated result).

To correctly perform NLU processing of speech input, an NLU process 1060 may be configured to determine a "domain" of the utterance so as to determine and narrow down which services offered by the endpoint device (e.g., server 1020 or device 1002) may be relevant. For example, an endpoint device or appliance may be controlled to alter an operation of the appliance.

The named entity recognition (NER) module 1062 receives a query in the form of ASR results and attempts to identify relevant grammars and lexical information that may be used to construe meaning. To do so, the NER module 1062 may begin by identifying potential domains that may relate to the received query. The NLU storage 1073 includes a database of appliances (1074a-1074n) identifying domains associated with specific appliances. For example, the appliance may be associated with domains for music, communication sessions, calendaring, contact lists, and device-specific communications, but not video. In addition, the entity library may include database entries about specific services on a specific appliance, either indexed by Device ID, User ID, or Household ID, or some other indicator.

In NLU processing, a domain may represent a discrete set of activities having a common theme, such as "communication session," "shopping," "music," "calendaring," "lighting," "temperature," etc. As such, each domain may be associated with a particular language model and/or grammar database (1076a, 1076b-1076n), a particular set of intents/ actions (1078a, 1078b-1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa, 1086ab-1086an. A user's music-domain lexical information might include album titles, artist names, and song names.

As noted above, in traditional NLU processing, a query may be processed applying the rules, models, and information applicable to each identified domain. For example, if a query potentially implicates both energy and music, the query may, substantially in parallel, be NLU processed using the grammar models and lexical information for energy, and will be processed using the grammar models and lexical information for music. The responses based on the query produced by each set of models is scored, with the overall highest ranked result from all applied domains ordinarily selected to be the correct result.

An intent classification (IC) module 1064 parses the query to determine an intent or intents for each identified domain, wherein the intent corresponds to the action to be performed that is responsive to the query. Each domain is associated with a particular set of intents/actions (1078a-1078n) of words linked to intents. For example, a music intent may link words and phrases such as "quiet," "volume off," and "mute" to a "mute" intent. A lighting intent may link words and phrases such as "on," "off," "up," "down," "lower," "raise," etc. The IC module 1064 identifies potential intents for each identified domain by comparing words in the query to the words and phrases in the set of intents actions 1078 for that domain. Traditionally, the determination of an intent by the IC module is performed using a set of rules or templates that are processed against the incoming text to identify a matching intent.

In order to generate a particular interpreted response, the NER 1062 applies the grammar models and lexical information associated with the respective domain to actually recognize and mention one or more entities in the text of the query. In this manner, the NER 1062 identifies "slots" (i.e., particular words in query text) that may be needed for later command processing. Depending on the complexity of the NER 1062, it may also label each slot with a type of varying levels of specificity (such as noun, place, city, artist name, song name, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the energy domain may include a database of words commonly used when people discuss power or energy.

The intents identified by the IC module 1064 are linked to domain-specific grammar frameworks (included in 1076) with "slots" or "fields" to be filled. Each slot/field corresponds to a portion of the query text that the system believes corresponds to an entity. For example, if "turn on the lights" is an identified intent, a grammar (1076) framework or frameworks may correspond to sentence structures such as "Enable power to the device {Appliance Name}," etc. However, to make resolution more flexible, these frameworks would ordinarily not be structured as sentences, but rather based on associating slots with grammatical tags.

For example, the NER module 1062 may parse the query to identify words as subject, object, verb, preposition, etc., based on grammar rules and/or models, prior to recognizing named entities. The identified verb may be used by the IC module 1064 to identify intent, which is then used by the NER module 1062 to identify frameworks. A framework for an intent of "turn on" may specify a list of slots/fields applicable to perform the action with respect to an identified "object" and any object modifier (e.g., a prepositional phrase), such as {Object Name}, {Appliance Identifier}, etc. The NER module 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazetteer for similarity with the framework slots. For example, a framework for "turn on" intent might indicate to attempt to resolve the identified object based {Appliance Name} or {Device Identifier} and another framework for the same intent might indicate to attempt to resolve the object modifier based on {Constraint}. If the search of the gazetteer does not resolve a slot/field using gazetteer information, the NER module 1062 may search the database of generic words associated with the domain (in the knowledge base 1072). So, for instance, if the query was "Turn on the lights," after failing to determine a device identifier of "the lights," the NER component 1062 may search the domain vocabulary or check generic words before the gazetteer information, or both may be tried, potentially producing two different results.

The output from the NLU processing (which may include tagged text, commands, etc.) may then be sent to a command processor 1090, which may be located on a same or separate server 1020 as part of system 1000. The destination command processor 1090 may be determined based on the NLU output. For example, if the NLU output includes a command to turn on the lights, or the like, the destination command processor 1090 may be the communication component discussed herein.

Figure 11:
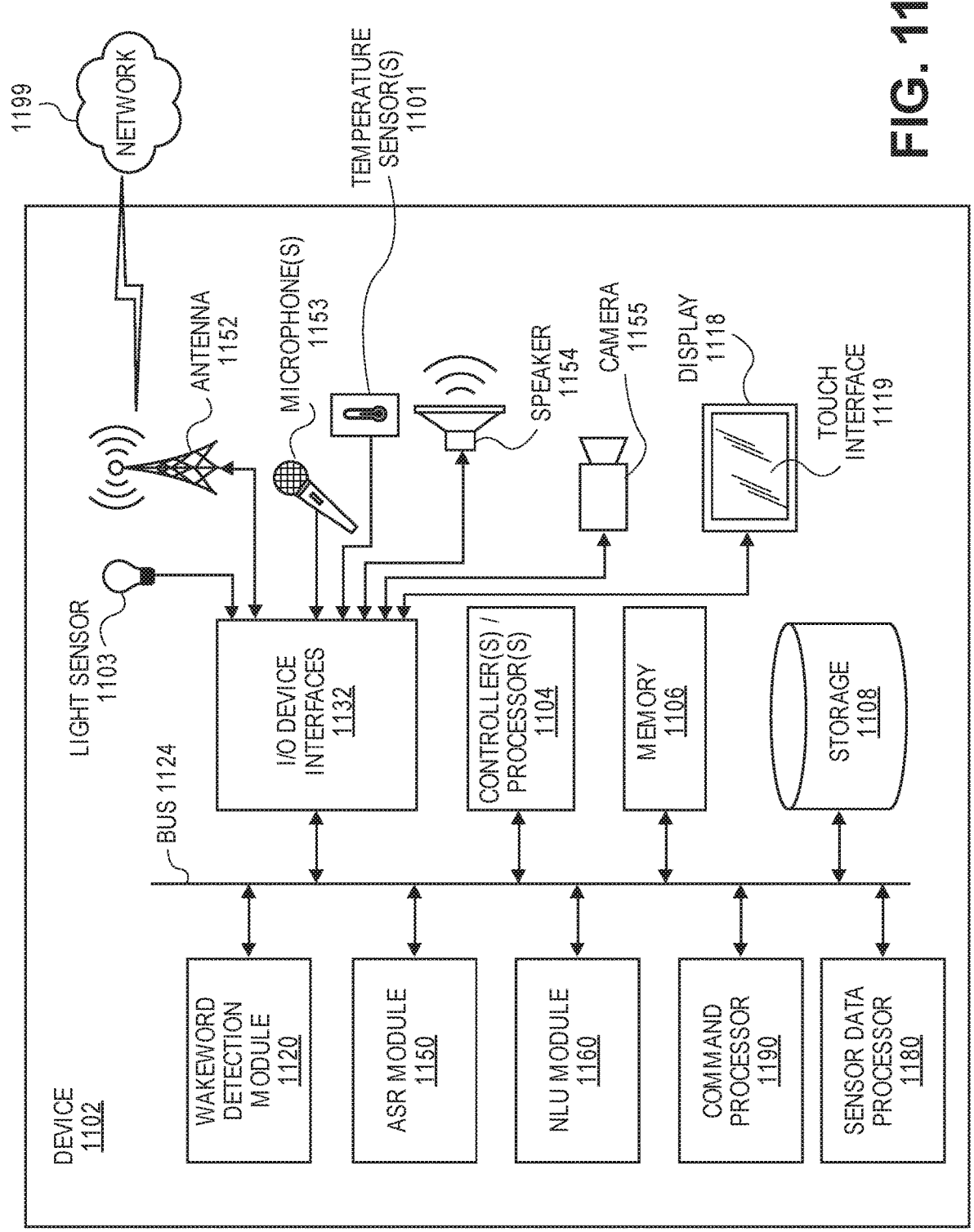
FIG. 11 illustrates example components of a speech-controlled device, in accordance with described implementations.
Figure 12:
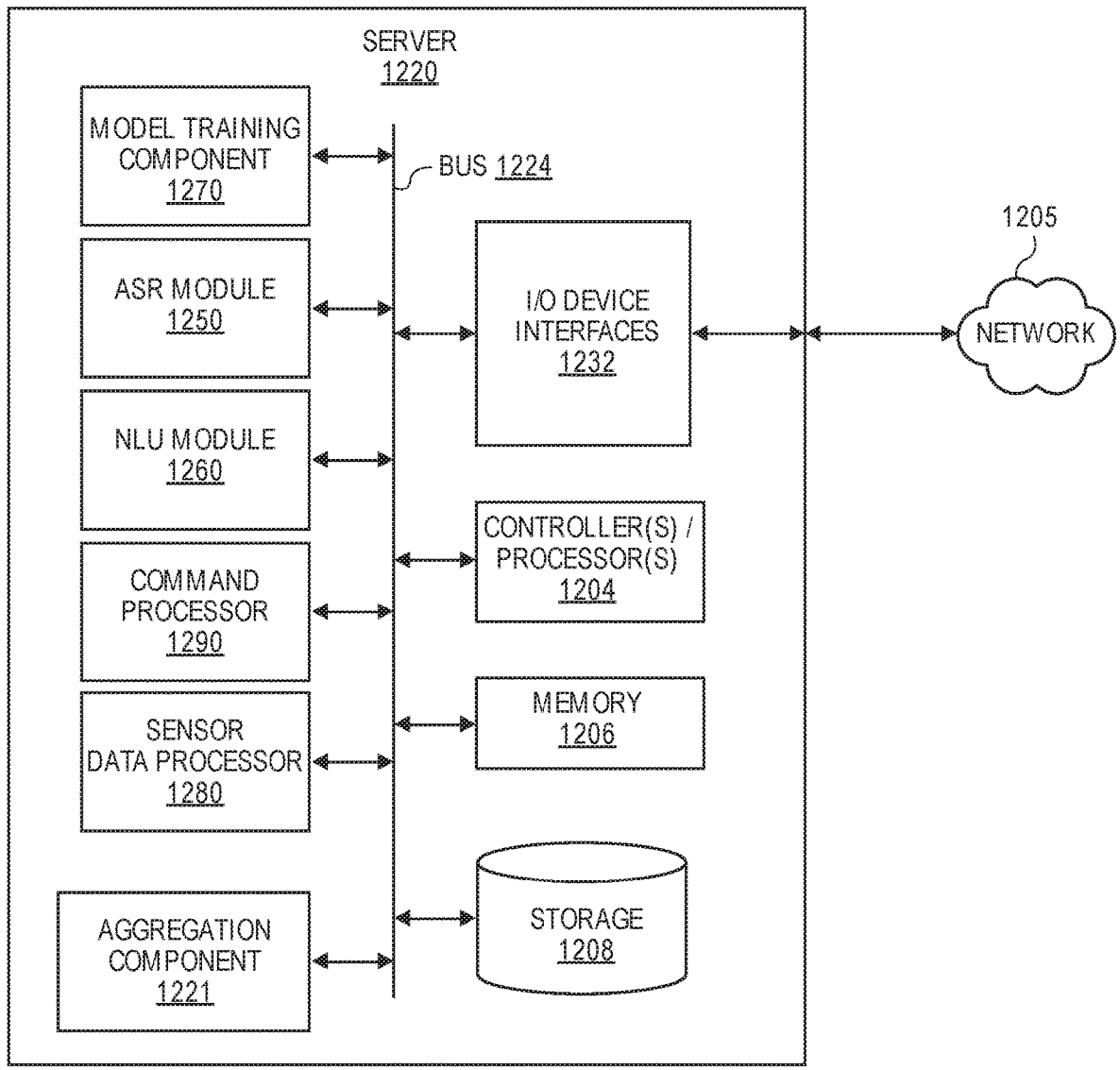
FIG. 12 illustrates example components of a server, in accordance with described implementations.

FIG. 11 is a block diagram conceptually illustrating a local device 1102 that may be used with the described system and referred to in some instances above as a communication component. FIG. 12 is a block diagram conceptually illustrating example components of a remote device, such as a remote server 1220 that may assist with ASR, NLU processing, command processing, and/or aggregating. Multiple such servers 1220 may be included in the system, such as one server(s) 1220 for training ASR models, one server(s) for performing ASR, one server(s) 1220 for performing NLU, one or more sensors for aggregating location environment condition scores, etc. In operation, each of these devices (or groups of devices) may include computer-readable and computer-executable instructions that reside on the respective device (1102/1220), as will be discussed further below.

Each of these devices (1102/1220) may include one or more controllers/processors (1104/1204), that may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive (MRAM) and/or other types of memory. Each device may also include a data storage component (1108/1208), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1132/1232).

Computer instructions for operating each device (1102/1220) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (1102/1220) includes input/output device interfaces (1132/1232). A variety of components may be connected through the input/output device interfaces, as will be discussed further below. Additionally, each device (1102/1220) may include an address/data bus (1124/1224) for conveying data among components of the respective device. Each component within a device (1102/1220) may also be directly connected to other components in addition to (or instead of) being connected to other components across the bus (1124/1224).

Referring to the device 1102 of FIG. 11, the device 1102 may include a display 1118, which may comprise a touch interface 1119. Alternatively, the device 1102 may be "headless" and may primarily rely on spoken commands for input. As a way of indicating to a user that a connection between another device has been opened, an action performed, etc., the device 1102 may be configured with a visual indicator, such as a LED or similar illumination element, that may change color, flash, or otherwise provide visual indications by the device 1102. The device 1102 may also include input/output device interfaces 1132 that connect to a variety of components such as an audio output component such as a speaker 1154, a wired headset or a wireless headset, and/or other components capable of outputting audio. The device 1102 may also include an audio capture component. The audio capture component may be, for example, a microphone 1153 or array of microphones, a wired headset or a wireless headset, etc. The microphone 1153 may be configured to capture audio, such as phrases or utterances from a user. If an array of microphones is included, approximate distance to a sound's point of origin may be determined using, for example, acoustic localization based on time and amplitude differences between sounds captured by different microphones of the array. The device 1102 (using microphone 1153, wakeword detection module 1120, ASR module 1150, etc.) may be configured to determine audio data corresponding to detected audio data. In addition, the device may be configured to communicate with and receive sensor data from other sensors and/or devices at the location that are in communication with the device 1102. For example, the device 1102 (using input/output device interfaces 1132, antenna 1152, etc.) may wirelessly communicate with and receive sensor data from other sensors and/or provide instructions to appliances within the location and/or receive data from the appliances. Any form of wired and/or wireless communication may be utilized to facilitate communication between the device 1102, sensors and/or appliances. For example, any one or more of 802.15.4 (ZIGBEE), 802.11 (WI-FI), 802.16 (WiMAX), BLUETOOTH, Z-WAVE, near field communication ("NFC"), etc., may be used to communicate between the device 1102 and one or more sensors and/or appliances.

Likewise, the device 1102 may also be configured to transmit received audio data sensor data and/or compute location environment condition scores to server 1220 for further processing or to process the data using internal components such as a wakeword detection module 1120 or sensor data processing module 1280. For example, via the antenna(s), the input/output device interfaces 1132 may connect to one or more networks 1199/1205 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, etc. A wired connection such as Ethernet may also be supported. Through the network(s) 1199/1205, the speech processing system may be distributed across a networked environment.

The device 1102 may also include other sensors that collect sensor data that is transmitted to the server 1220 and/or used in computing location environment condition scores. Any number and/or type of sensor may be included in the device. In the illustrated example, in addition to the microphone, the device 1102 includes a light sensor 1103, a camera 1155, and a temperature sensor 1101. Other sensors may likewise be included in the device 1102.

The device 1102 and/or server 1220 may include an ASR module (1150/1250). The ASR module 1150 in device 1102 may be of limited or extended capabilities or may not be included in the device 1102. The ASR module(s) may include the language models stored in the ASR model storage component, and perform the automatic speech recognition process. If limited speech recognition is included on the device 1102, the ASR module 1150 may be configured to identify a limited number of words, such as keywords detected by the device, whereas extended speech recognition may be configured to recognize a much larger range of words.

The device 1102 and/or server 1220 may include a limited or extended NLU module (1160/1260). The NLU module in device 1102 may be of limited or extended capabilities, or may not be included on the device 1102. The NLU module(s) may comprise the name entity recognition module, the intent classification module and/or other components, as discussed above. The NLU module(s) may also include a stored knowledge base and/or entity library, or those storages may be separately located.

The device 1102 and/or server 1220 may also include a command processor (1190/1290) that is configured to execute commands/functions associated with a spoken command/action and/or autonomous actions as described above and/or transmit instructions to controlled appliances. For example, the command processor may maintain one or more autonomous actions that are periodically processed by the command processor 1190/1290 based on device environment condition scores, location environment condition scores, and/or aggregated environment condition scores, as discussed above. Likewise, the spoken commands/actions that are executed by the command processor 1190/1290 may factor in the device environment condition scores, location environment condition scores, and/or aggregated environment condition scores in performing the spoken command. For example, if the spoken command is to turn on the lights in the kitchen, the command processor may consider an outdoor ambient light score, a known impact the outdoor light has on the kitchen location, and adjust the artificial lighting based on those factors.

The device 1102 and/or the server 1220 may also include a sensor data processor 1180/1280 that processes sensor data to produce device environment condition scores and/or location environment condition scores. As discussed above, in some implementations the sensor data from devices at a location may be sent to the device 1102 for processing. In such an implementation, the device may process the sensor data to generate one or more device environment condition scores using one or more classifiers. In a similar manner, if the sensor data is sent to the server, the server may process the sensor data using classifiers to generate environment condition scores. Each classifier is trained for the respective data type and to generate an environment score for a particular environment condition. As discussed above, different classifiers may be used to process the same data to produce different environment condition scores for different environment conditions.

The device 1102 may include a wakeword detection module 1120, which may be a separate component or may be included in an ASR module 1150. The wakeword detection module 1120 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some implementations, the device 1102 may be configured collectively to identify a set of the directional audio signals in which the wake expression is detected or in which the wake expression is likely to have occurred.

The wakeword detection module 1120 receives captured audio and processes the audio to determine whether the audio corresponds to particular keywords recognizable by the device 1102 and/or system. The storage 1108 may store data relating to keywords and functions to enable the wakeword detection module 1120 to perform the algorithms and methods described above. The locally stored speech models may be pre-configured based on known information, prior to the device 1102 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 1102 prior to the user device 1102 being delivered to the user or configured to access the network by the user. The wakeword detection module 1120 may access the storage 1108 and compare the captured audio to the stored models and audio sequences using audio comparison, pattern recognition, keyword spotting, audio signature, and/or other audio processing techniques.

The server may include a model training component 1270. The model training component may be used to train the classifier(s)/models discussed above. For example, the model training component may receive sensor data, speech input etc., and utilize one or more of the discuss techniques to train the different models maintained by the system.

The server may also include an aggregation component 1221. As discussed above, the aggregation component may aggregate multiple location environment condition scores to generate an aggregated environment condition score for the area. This may be done for multiple environment conditions for a single area and done for multiple areas. Also, as discussed above the aggregation component 1221 may weight some location environment condition scores more than others as part of the aggregation.

As noted above, multiple devices may be employed in a single processing system. In such a multi-device system, each of the devices may include different components for performing different aspects of the processing. The multiple devices and/or appliances may include overlapping components and/or be controlled by the same controller, such as the controller discussed below with respect to FIG. 15. The components of the devices 1102 and server 1220, as illustrated in FIGS. 11 and 12, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, energy management, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   receiving, at a first device at a first location within an area, a first image data generated by a first camera at the first location;
   processing, at the first device, the first image data to determine a first portion of the first image data represents a first outdoor area;
   processing, at the first device, the first portion of the first image data to determine a first outdoor light level score representative of a first outdoor ambient light level at the first location;
   determining, at the first device and using the first outdoor light level score, a first location outdoor light score representative of a first outdoor light level at the first location;
   sending, from the first device to a management system executing on a remote computing resource, the first location outdoor light score;
   receiving, at a second device at a second location within the area, second image data generated by a second camera at the second location;
   processing, at the second device, the second image data to determine a second portion of the second image data represents a second outdoor area;
   processing, at the second device, the second portion of the second image data to determine a second outdoor light level score representative of a second outdoor light level at the second location;
   determining, at the second device and using the second outdoor light level light score, a second location outdoor light score representative of a second outdoor ambient light level at the second location;
   sending, from the second device to the management system, the second location outdoor light score;
   generating, at the management system, an aggregated outdoor light score for the area using the first location outdoor light score and the second location outdoor light score;
   sending to a third device at a third location within the area, the aggregated outdoor light score; and
   in response to the aggregated outdoor light score, causing, at the third device, an autonomous action to be executed that includes altering an illumination level of a light at the third location.

2. The computer-implemented method of claim 1, wherein causing the autonomous action to be executed further includes at least one of: turning on the light at the third location, turning off the light at the third location, dimming the light at the third location, brightening the light at the third location, raising a window blind at the third location, lowering a window blind at the third location, raising a garage door at the third location, or lowering the garage door at the third location.

3. The computer-implemented method of claim 1, wherein:
   processing, at the first device, the first image data to determine the first portion of the first image data represents the first outdoor area, further includes:
      processing the first image data using an image processing algorithm to determine a plurality of pixels included in the first image data representative of the first outdoor area; and
   processing, at the first device, the first portion of the first image data to determine the first outdoor light level score, further includes:
      determining the first outdoor light level score based at least in part on pixel values of the plurality of pixels.

4. The computer-implemented method of claim 1, further comprising:
   receiving, at the first device, third image data generated by a third camera at the first location;
   processing, at the first device, the third image data to generate a third outdoor light level score representative of a third outdoor ambient light level at the first location; and
   wherein determining, at the first device, the first location outdoor light score further includes:
      averaging the first outdoor light level score and the second outdoor light level score to produce the first location outdoor light score.

5. The computer-implemented method of claim 1, further comprising:
   determining, at the third device, a user preference of a light level at the third location; and
   wherein causing the autonomous action to be executed that includes altering the illumination level of the light at the third location, further includes:
      determining a desired light level of the light at the third location based at least in part on the aggregated light score and the user preference.

6. A system, comprising:
a first device at a first location within an area;
a second device at a second location within the area;
a third device at a third location within the area;
a management system, including:
one or more processors; and
a memory coupled to the one or more processors and storing program instructions that when executed by the one or more processors cause the one or more processors to at least:
receive, from the first device, a first environment data;
receive, from the second device, a second environment data;
assign a first weighting value to the first environment data based at least in part on a first distance between the third location and the first location;
assign a second weighting value to the second environment data based at least in part on a second distance between the third location and the second location;
generate an aggregated environment condition score representative of an environment condition at the third location based at least in part on a combination of the first environment data weighted according to the first weighting value and the second environment data weighted according to the second weighting value; and
send, to the third device at the third location, the aggregated environment condition score;
wherein the third device is configured to at least:
receive, the aggregated environment condition score;
use the aggregated environment condition score as an input to determine that an autonomous action is to be performed; and
in response to a determination that the autonomous action is to be performed, cause the autonomous action to be performed, wherein the autonomous action includes altering an illumination level of a light at the third location.

7. The computing system of claim 6, wherein environment data is not received from the third location.

8. The computing system of claim 6, wherein the program instructions further cause the one or more processors to at least:
determine, based at least in part on the first environment data and the second environment data, a confidence score for the first device indicating an accuracy of the first device; and
wherein the program instructions that when executed by the one or more processors to generate an aggregated environment condition score, further include instructions that, when executed by the one or more processors, further cause the one or more processors to at least:
assign a third weighting value to at least the first environment data based at least in part on the confidence score.

9. The computing system of claim 8, wherein the confidence score is further based at least in part on a comparison of the first environment data and a baseline environment data received from a third party.

10. The computing system of claim 6, wherein the first environment data includes at least one of a numerical environment data score or an image of the first location.

11. The computing system of claim 6, wherein the first environment data indicates at least one of an illumination level, a temperature level, a humidity level, a raining determination, a snowing determination, a wind speed, a wind direction, or a barometric level.

12. The computing system of claim 6, wherein the program instructions further cause the one or more processors to at least:
assign a third weighting value to the first environment data based at least in part on one or more of a first time associated with the first environment data or a first confidence value associated with the first device;
assign a fourth weighting value to the second environment data based at least in part on one or more of a second time associated with the second environment data or a second confidence value associated with the second device; and
wherein at least the first environment data and the second environment data are aggregated based at least in part on the third weighting value and the fourth weighting value.

13. The computing system of claim 6, wherein:
the first environment data includes image data; and
the program instructions further cause the one or more processors to at least:
determine a portion of the image data represents an outdoor area; and
process the portion of the image data to determine an outdoor illumination level score; and
wherein the aggregated environment condition score is determined based at least in part on the outdoor illumination level score and is representative of an outdoor illumination level at the area.

14. The computing system of claim 6, wherein the program instructions further cause the one or more processors to at least:
receive, from a plurality of devices within the area, environment data; and
generate, based at least in part on the aggregated environment condition score and the environment data, an environment map representative of the environment condition within the area.

15. The computing system of claim 6, wherein the program instructions further cause the one or more processors to at least:
receive, from a third device at the third location in the area, a request for the aggregated environment condition score; and
in response to the request, send to the third device the aggregated environment condition score.

16. A system, comprising:
a first plurality of sensors at a first location within an area;
a first device at the first location communicatively coupled to the first plurality of sensors;
a second plurality of sensors at a second location within the area;
a second device at a second location within the area communicatively coupled to the second plurality of sensors;
a management system at a remote location that is different than the first location and the second location, the management system configured to at least:
receive, from the first device, a first location environment condition score, determined from sensor data collected from each of the first plurality of sensors, the first location environment condition score representative of an environment condition at the first location;

receive, from the second device a second location environment condition score, determined from sensor data collected from each of the second plurality of sensors, the second location environment condition score representative of the environment condition at the second location;

assign a first weighting value to the first location environment condition score based at least in part on one or more of a first time associated with the first location environment condition score or a first confidence value associated with the first location;

assign a second weighting value to the second location environment condition score based at least in part on one or more of a second time associated with the second location environment condition score or a second confidence value associated with the second location;

generate an aggregated environment condition score representative of an environment condition in the area based at least in part on the first location environment condition score, the second location environment condition score, the first weighting, and the second weighting; and send, to the first device, the aggregated environment condition score;

wherein the first device is configured to at least:

receive, the aggregated environment condition score;

use the aggregated environment condition score as an input to determine that an autonomous action is to be performed; and in response to a determination that the autonomous action is to be performed, cause the autonomous action to be performed, wherein the autonomous action includes altering an illumination level of a light at the first location.

17. The system of claim 16, wherein the first device is further configured to at least:

cause a second action to be performed in response to a spoken command in which the second action is based at least in part on the aggregated environment condition score.

18. The system of claim 16, further comprising:

a third device at a third location within the area, wherein the third device is configured to at least:

receive the aggregated environment condition score; and in response to receipt of the aggregated environment condition score, cause at least one action to be performed, wherein the at least one action is at least one of: adjusting an artificial light level at the third location, or adjusting a position of a window blind at the third location.

19. The system of claim 16, wherein the first device is further configured to at least:

use a plurality of inputs to determine that the autonomous action is to be performed, wherein the plurality of inputs includes the aggregated environment condition score and at least one of a user preference, an aggregated preference for the area, a detected presence of a user at the first location, a time or day, a time of year, or a user activity.

20. The system of claim 16, wherein the first device is further configured to at least:

receive a user requested action to alter the illumination level of the light at the first location;

determine, based at least in part on the aggregated environment condition score, a level of the illumination of the light to alter; and cause the illumination of the light to be altered according to the level.

\* \* \* \* \*